(12) United States Patent
Araumi et al.

(10) Patent No.: US 11,705,814 B2
(45) Date of Patent: Jul. 18, 2023

(54) SWITCHING CONTROL CIRCUIT AND LLC CONVERTER

(71) Applicant: FUJI ELECTRIC CO., LTD., Kawasaki (JP)

(72) Inventors: Ryuunosuke Araumi, Hino (JP); Ryuji Yamada, Hachioji (JP)

(73) Assignee: FUJI ELECTRIC CO., LTD., Kawasaki (JP)

( * ) Notice: Subject to any disclaimer, the term of this patent is extended or adjusted under 35 U.S.C. 154(b) by 176 days.

(21) Appl. No.: 17/212,005

(22) Filed: Mar. 25, 2021

(65) Prior Publication Data

US 2021/0376738 A1 Dec. 2, 2021

(30) Foreign Application Priority Data

May 27, 2020 (JP) .................................. 2020-092505

(51) Int. Cl.
*H02M 3/335* (2006.01)
*H02M 1/08* (2006.01)
*H02M 1/00* (2006.01)

(52) U.S. Cl.
CPC ......... *H02M 3/33569* (2013.01); *H02M 1/08* (2013.01); *H02M 1/0009* (2021.05)

(58) Field of Classification Search
CPC ........... H02M 3/33576; H02M 1/0025; H02M 1/0035; H02M 1/08; H02M 1/0009; H02M 3/01

See application file for complete search history.

(56) References Cited

U.S. PATENT DOCUMENTS

| 9,071,156 | B2 | 6/2015 | Fukutani |
| 9,929,661 | B2* | 3/2018 | Chen ....................... H02M 1/36 |
| 10,715,047 | B1* | 7/2020 | Chiu ................. H02M 3/33571 |
| 2013/0108303 | A1 | 5/2013 | Samejima et al. |
| 2017/0110974 | A1* | 4/2017 | Chen ....................... H02M 1/08 |
| 2017/0155333 | A1* | 6/2017 | Chen ....................... H02M 1/36 |

(Continued)

FOREIGN PATENT DOCUMENTS

| JP | 2001-309657 A | 11/2001 |
| JP | 2005-198456 A | 7/2005 |

(Continued)

*Primary Examiner* — Kyle J Moody
(74) *Attorney, Agent, or Firm* — Rabin & Berdo, P.C.

(57) ABSTRACT

A switching control circuit for controlling an LLC converter that includes a first switching device, a first free-wheeling diode connected in parallel with the first switching device, a second switching device connected in series with the first switching device and the first free-wheeling diode, and a second free-wheeling diode connected in parallel with the second switching device. The switching control circuit controls switching of the first and second switching devices. The switching control circuit includes a determination circuit determining whether an operation mode of the LLC converter is a first mode or a second mode based on the resonant current of the LLC converter, and a drive signal output circuit outputting first and second drive signals for respectively switching the first and second switching devices based on the determined operation mode, to thereby prevent a shoot-through current from flowing through the first switching device or the second switching device.

19 Claims, 13 Drawing Sheets

(56) References Cited

U.S. PATENT DOCUMENTS

| | | | |
|---|---|---|---|
| 2017/0179838 A1 | 6/2017 | Horii | |
| 2018/0054134 A1* | 2/2018 | Moon | H02M 3/33523 |
| 2018/0191256 A1* | 7/2018 | Giombanco | H02M 3/33571 |
| 2019/0393769 A1* | 12/2019 | Wei | H02M 3/33592 |

FOREIGN PATENT DOCUMENTS

| | | | |
|---|---|---|---|
| JP | 2009-027803 A | 2/2009 | |
| JP | 4386743 B2 | 12/2009 | |
| JP | 4386744 B2 | 12/2009 | |
| JP | 2010-004596 A | 1/2010 | |
| JP | 2013-099110 A | 5/2013 | |
| JP | 5729989 B2 | 6/2015 | |
| JP | 2016-025757 A | 2/2016 | |
| JP | 2016-046838 A | 4/2016 | |
| JP | 2016-077042 A | 5/2016 | |
| JP | 2016-119776 A | 6/2016 | |
| JP | 6562618 B2 | 8/2019 | |

* cited by examiner

SWITCHING CONTROL CIRCUIT AND LLC CONVERTER

CROSS-REFERENCE TO RELATED APPLICATION

The present application claims priority pursuant to 35 U.S.C. § 119 from Japanese patent application number 2020-092505 filed on May 27, 2020, the entire disclosure of which is hereby incorporated by reference herein.

BACKGROUND

Technical Field

The present disclosure relates to a switching control circuit and an LLC converter.

Description of the Related Art

In an LLC converter, when a switching frequency enters a capacitive load region, deviation from the expected resonance condition (i.e., out-of-resonance) may occur, which may cause a shoot-through current to flow from a power supply to the ground (for example, Japanese Patent Application Publication Nos. 2005-198456 and 2010-004596).

Incidentally, there is a circuit for reducing a shoot-through current that flows upon activation of the LLC converter, for example. However, this circuit is unable to reduce a shoot-through current during normal operation after the activation.

The present disclosure is directed to provision of a switching control circuit that effectively reduces a shoot-through current regardless of an operation of an LLC converter.

SUMMARY

A switching control circuit according to an aspect of the present disclosure for controlling an LLC converter that includes a first switching device, a first free-wheeling diode connected in antiparallel with the first switching device, a second switching device connected in series with the first switching device and the first free-wheeling diode, and a second free-wheeling diode connected in antiparallel with the second switching device, the switching control circuit being configured to control switching of the first and second switching devices, the switching control circuit comprising: a determination circuit configured to determine whether an operation mode of the LLC converter is a first mode or a second mode based on a resonant current of the LLC converter; and a drive signal output circuit configured to output first and second drive signals for respectively switching the first switching device and the second switching device based on the determined operation mode, to thereby prevent a shoot-through current from flowing through the first switching device or the second switching device.

An LLC converter according to an aspect of the present disclosure, comprising: a first switching device; a first free-wheeling diode connected in antiparallel with the first switching device; a second switching device; a second free-wheeling diode connected in antiparallel with the second switching device; a determination circuit configured to determine whether an operation mode of the LLC converter is a first mode or a second mode based on a resonant current of the LLC converter; and a drive signal output circuit configured to output first and second drive signals for respectively switching the first switching device and the second switching device based on the determined operation mode, to thereby prevent a shoot-through current from flowing through the first switching device and the second switching device.

BRIEF DESCRIPTION OF THE DRAWINGS

FIG. 2 is a diagram illustrating one example of a shoot-through current that flows when an NMOS transistor 23 on the ground side on is turned on after an NMOS transistor 22 on the power supply side is turned on.

FIG. 3 is a diagram illustrating one example of a shoot-through current that flows when an NMOS transistor 22 on the power supply side is turned on after an NMOS transistor 23 on the ground side is turned on.

FIG. 5 is a diagram illustrating one example of a shoot-through current that flows when an NMOS transistor 22 on the power supply side is turned on after an NMOS transistor 23 on the ground side is turned on.

FIG. 7 is a diagram illustrating one example of a shoot-through current that flows when an NMOS transistor 23 on the ground side is turned on after an NMOS transistor 22 on the power supply side is turned on.

DETAILED DESCRIPTION

At least following matters will become apparent from the description in the present specification and the accompanying drawings.

Embodiments

<<<Outline of Switching Power Supply Circuit 10>>>

Figure 1:
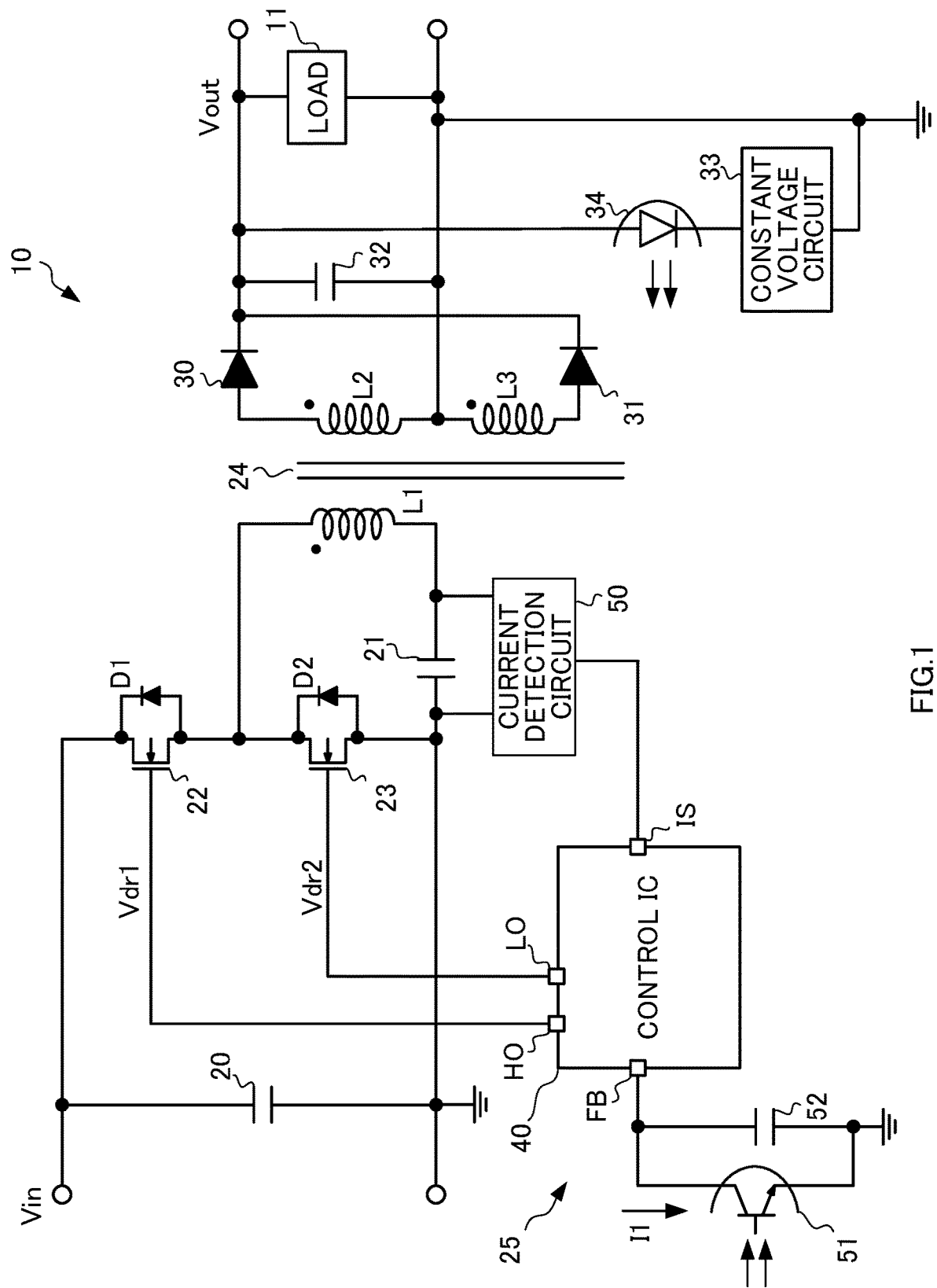
FIG. 1 is a diagram illustrating one example of a configuration of a switching power supply circuit 10.

FIG. 1 is a diagram illustrating a configuration of a switching power supply circuit 10 according to one embodiment of the present disclosure. The switching power supply circuit 10 is an LLC converter that generates an output voltage Vout at a target level at a load 11 from a predetermined input voltage Vin.

The switching power supply circuit 10 comprises capacitors 20, 21, 32, NMOS transistors 22, 23, a transformer 24, a control block 25, diodes 30, 31, a constant voltage circuit 33, and a light-emitting diode 34.

The capacitor 20 stabilizes a voltage between a power supply line to which the input voltage Vin is applied and a ground line to which a ground voltage GND is applied, and removes noise and the like. The input voltage Vin is a direct current voltage at a predetermined level. The capacitor 21 is a so-called resonant capacitor that constitutes a resonant circuit.

The NMOS transistor 22 is a high-side power transistor, and the NMOS transistor 23 is a low-side power transistor.

A diode D1 is a body diode of the NMOS transistor 22, and a diode D2 is a body diode of the NMOS transistor 23. The diodes D1, D2 operate as so-called free-wheeling diodes.

Note that the NMOS transistors 22, 23 are used as a switching device in an embodiment of the present disclosure, however, for example, a PMOS transistor, a bipolar transistor, or a Gate Bipolar Transistor (IGBT) may be used. In the case of the bipolar transistor, an external diode is connected in antiparallel to the bipolar transistor instead of the body diode of the NMOS transistor, to form a free-wheeling diode. Note that antiparallel connection indicates a form in which a diode is connected in parallel with the NMOS transistor 22 or the NMOS transistor 23 with the cathode thereof being on the input voltage Vin side and the anode thereof being on the ground voltage GND side.

The transformer 24 comprises a primary coil L1 and secondary coils L2, L3, where the primary coil L1 and the secondary coils L2, L3 are insulated from one another. In the transformer 24, a voltage is generated in the secondary coils L2, L3 on the secondary side according to a variation in the voltage across the primary coil L1 on the primary side.

The primary coil L1 has one end connected with the source of the NMOS transistor 22 and the drain of the NMOS transistor 23, and the other end connected with the source of the NMOS transistor 23 via the capacitor 21.

Accordingly, when the switching of the NMOS transistors 22, 23 is started, the voltage of the secondary coils L2, L3 varies. The primary coil L1 and the secondary coils L2, L3 are electromagnetically coupled with the same polarity.

The control block 25 is a circuit block that controls the switching of the NMOS transistors 22, 23, and the details thereof will be described later in detail.

The diodes 30, 31 rectify the voltage of the secondary coils L2, L3, and the capacitor 32 smooths the rectified voltage. As a result, the smoothed output voltage Vout is generated in the capacitor 32. Note that the output voltage Vout results in a direct current voltage at a target level.

The constant voltage circuit 33 generates a constant direct current voltage, and is configured with a shunt regulator, for example.

The light-emitting diode 34 is a device that emits light having an intensity according to a difference between the output voltage Vout and an output of the constant voltage circuit 33, and constitutes a photocoupler with a phototransistor 51 which will be described later. In an embodiment of the present disclosure, when the level of the output voltage Vout rises, the intensity of the light from the light-emitting diode 34 increases.

Note that such a form in which the primary coil L1 and the capacitor 21 that are connected in series are connected in parallel with the NMOS transistor 23 has been described, however, the primary coil L1 and the capacitor 21 connected in series may be connected in parallel with the NMOS transistor 22.

<<<Control Block 25>>>

The control block 25 includes a control IC 40, a current detection circuit 50, the phototransistor 51, and a capacitor 52.

The control IC 40 is an integrated circuit that controls the switching of the NMOS transistors 22, 23 and has terminals FB, IS, HO, and LO.

The terminal FB is a terminal at which a feedback voltage Vfb corresponding to the output voltage Vout is generated, and to which the phototransistor 51 and the capacitor 52 are connected. The phototransistor 51 allows a bias current I1 having a magnitude corresponding to the intensity of the light emitted from the light-emitting diode 34 to flow from the terminal FB to the ground, and the capacitor 52 is provided to remove noise between the terminal FB and the ground. Thus, the phototransistor 51 operates as a transistor that generates a sink current.

The terminal IS is a terminal to which a voltage Vis corresponding to a current value of a resonant current Icr of the primary coil L1 is applied by the current detection circuit 50 that detects the resonant current Icr flowing through the capacitor 21. Note that the current detection circuit 50 detects the resonant current Icr, and outputs the voltage Vis corresponding to the direction and magnitude of the resonant current Icr. The configuration of this current detection circuit 50 is not particularly limited, however, a form in which a resistor and a capacitive element are connected in series is one example. A connection point between the resistor and the capacitive element is connected to the terminal IS. The form may be another form in which two resistors are connected in series, and a connection point between the resistors is connected to the terminal IS.

The terminal HO is a terminal from which a drive signal Vdr1 for driving the NMOS transistor 22 is output, and is connected to the gate of the NMOS transistor 22.

The terminal LO is a terminal from which a drive signal Vdr2 for driving the NMOS transistor 23 is output, and is connected to the gate of the NMOS transistor 23. Note that the control IC 40 corresponds to a "switching control circuit". Further, the diode D1 corresponds to a "first free-wheeling diode", and the diode D2 corresponds to a "second free-wheeling diode".

<<<Explanation of Shoot-Through Current in Switching Power Supply Circuit 10>>>

In the switching power supply circuit 10 according to an embodiment of the present disclosure, in switching the NMOS transistors 22, 23, a dead time during which both the NMOS transistors 22, 23 are off is set. However, in the switching power supply circuit 10, for example, when out-of-resonance occurs, a shoot-through current may flow from the power supply side to the ground side. The shoot-through current that occurs in the switching power supply circuit 10 will be described below.

==Shoot-Through Current that Occurs in Normal Operation==

Figure 2:
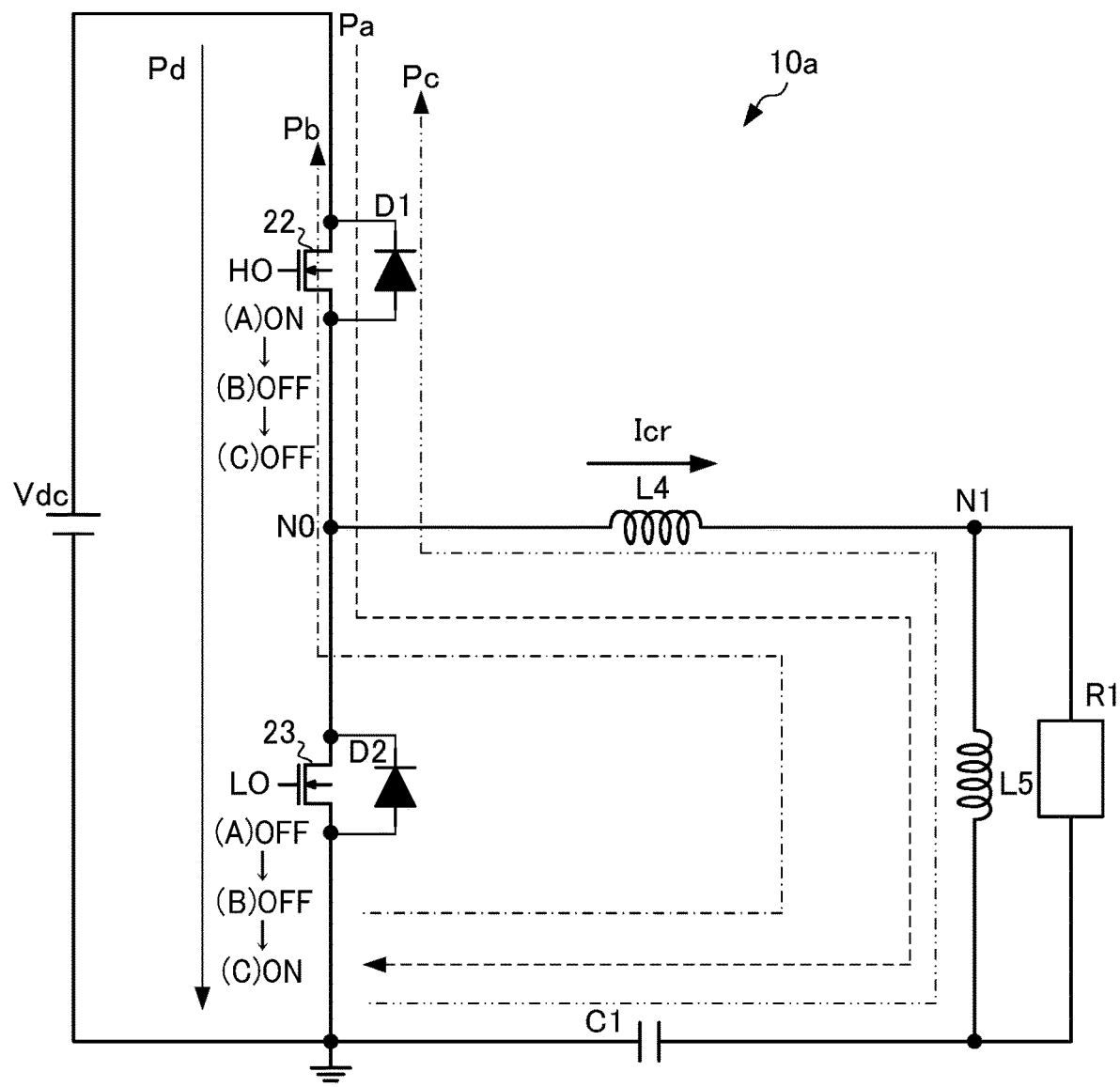

FIG. 2 is a diagram illustrating one example of the shoot-through current that flows, when the NMOS transistor 23 on the ground side is turned on (state C), after the NMOS transistor 22 on the power supply side is turned on (state A), and illustrates an equivalent circuit 10a for the transformer 24, the capacitor 21, and a secondary-side circuit of the transformer 24 of the switching power supply circuit 10.

The equivalent circuit 10a comprises inductors L4, L5, a capacitor C1, and an alternating current (AC) equivalent resistor R1 representing a rectifier circuit on the secondary side and the like.

The NMOS transistors 22, 23 are on in a complementary manner. Specifically, while the NMOS transistor 22 is on, the NMOS transistor 23 on the opposite side is off, and while the NMOS transistor 23 is on, the NMOS transistor 22 on the opposite side is off.

Here, a connection point between the NMOS transistors 22 and 23 (i.e., a node between the NMOS transistor 22 and the NMOS transistor 23) is referred to as a node NO, and a connection point between the inductors L4 and L5 is referred to as a node N1. Note that a resonant current Icr that flows in the equivalent circuit 10a is a current whose positive direction is a direction from the node NO to the node N1 (i.e., the resonant circuit configured with the primary coil L1 and the capacitor 21).

In the state A, when a high level (hereinafter, referred to as high or high level) voltage is output from the terminal HO, the NMOS transistor 22 is turned on. In the state A, a low level (hereinafter, referred to as low or low level) voltage is output from the terminal LO, so that the NMOS transistor 23 is turned off.

At this time, first, the resonant current Icr in the positive direction flows via the NMOS transistor 22 as illustrated by a path Pa. Then, the resonant current Icr in the positive direction is reduced by the resonant operation of a resonant circuit configured with the inductors L4, L5 and a capacitor C1.

The resonant current Icr in the positive direction reduces, and the resonant current Icr flows in a negative direction via the NMOS transistor 22 as illustrated by a path Pb.

Thereafter, in the state B, when a low voltage is output from the terminal HO, the NMOS transistor 22 is turned off. Then, as illustrated by a path Pc, the resonant current Icr flows in a direction in which the resonant current Icr flows to a direct current (DC) power supply Vdc via the diode D1, in other words, in the negative direction.

Figure 4:
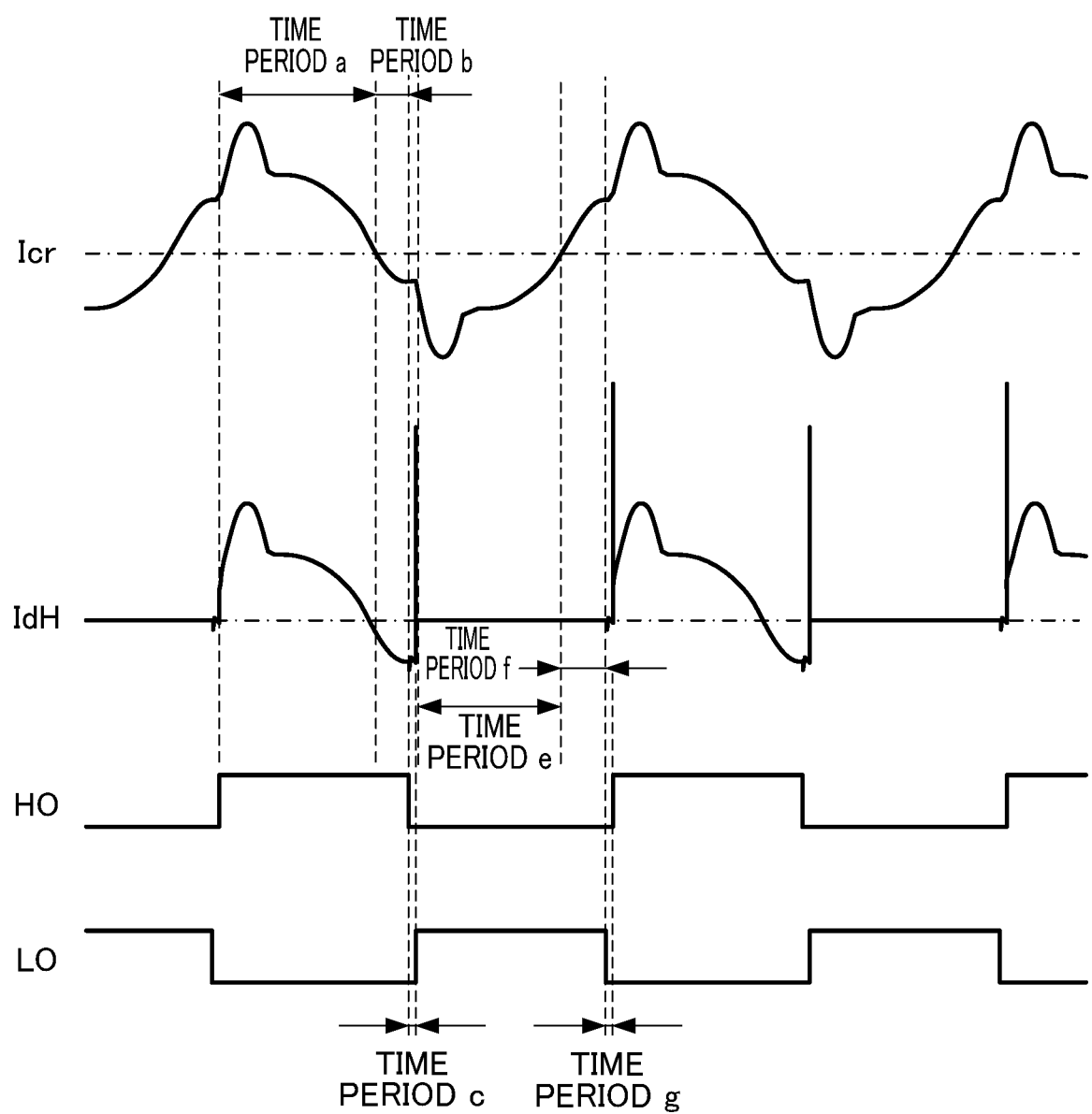
FIG. 4 is a diagram illustrating one example of a resonant current Icr in a case where a shoot-through current flows.

As a result, for example, as illustrated in FIG. 4, the resonant current Icr results in a negative value in a time period of the dead time after the NMOS transistor 22 is turned off. At this time, a drain current IdH that flows through the NMOS transistor 22 also results in being negative, and the resonant current Icr flows through the diode D1.

Note that, in FIG. 4, time periods a, b, c correspond to the paths Pa, Pb, Pc, respectively. Accordingly, in the time periods a, b, c, changes in the current value of the resonant current Icr when the resonant current Icr flows are separately illustrated for the paths Pa, Pb, Pc, respectively.

Then, in the state C, when a high voltage is output from the terminal LO, the NMOS transistor 23 is turned on. When the NMOS transistor 23 is turned on while the resonant current Icr flows through the diode D1, a reverse recovery current flows through the diode D1, and thus the shoot-through current flows from the power supply side to the ground side as illustrated by a path Pd.

Note that the term "reverse recovery current" represents the current that flows in a direction from the cathode to the anode of a diode by carriers stored in the diode, upon application of a reverse bias voltage to the diode, when a bias direction changes from a state where a forward current flows through the diode with a forward bias voltage being applied to the diode.

Figure 3:
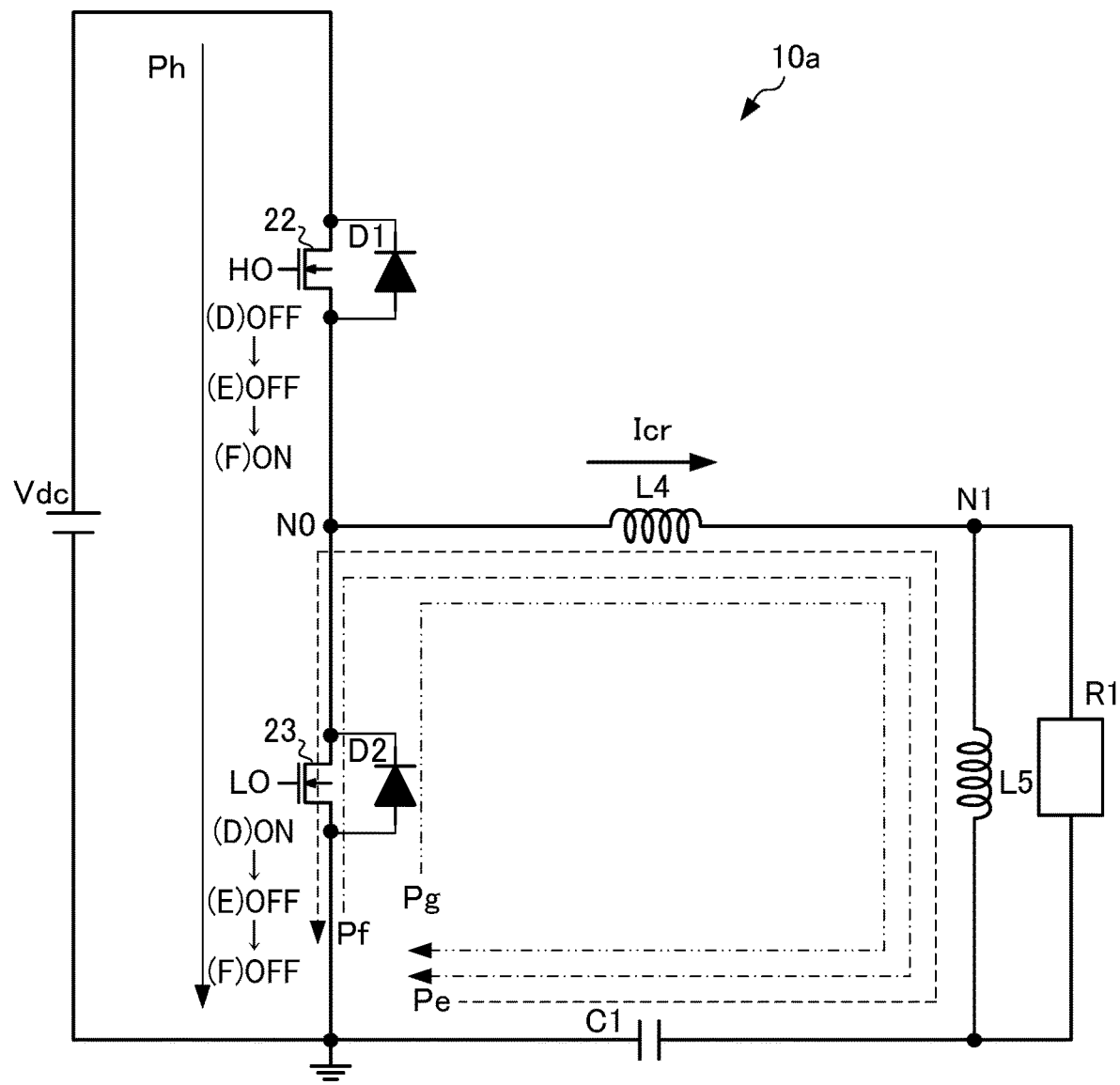

FIG. 3 is a diagram illustrating one example of the shoot-through current that flows, when the NMOS transistor 22 on the power supply side is turned on (state F), after the NMOS transistor 23 on the ground side is turned on (state D). Since the equivalent circuit 10a is the same as in FIG. 2, the explanation thereof is omitted.

In the state D, when a high voltage is output from the terminal LO, the NMOS transistor 23 is turned on. In the state D, a low voltage is output from the terminal HO, and the NMOS transistor 22 is turned off.

At this time, first, the resonant current Icr in the negative direction flows as illustrated by a path Pe. Then, the resonant current Icr in the negative direction is reduced by the resonant operation of the resonant circuit configured with the inductors L4, L5 and the capacitor C1.

The resonant current Icr in the negative direction reduces, and the resonant current Icr flows in the positive direction via the NMOS transistor 23 as illustrated by a path Pf.

Thereafter, in the state E, when a low voltage is output from the terminal LO, the NMOS transistor 23 is turned off. Then, as illustrated by a path Pg, the resonant current Icr flows in a direction in which the resonant current Icr flows to the node NO via the diode D2, in other words, in the positive direction.

As a result, for example, as illustrated in FIG. 4, the resonant current Icr results in a positive value during a time period corresponding to the dead time after turning off of the NMOS transistor 23.

Note that, in FIG. 4, time periods e, f, g correspond to the paths Pe, Pf, Pg, respectively. Accordingly, in the time periods e, f, g, changes in the current value of the resonant current Icr when the resonant current Icr flows are separately illustrated for the paths Pe, Pf, Pg, respectively.

Then, in the state E, the NMOS transistor 23 is off, and thus, as illustrated by the path Pg, the resonant current Icr in the positive direction flows to the node NO via the diode D2.

At this time, in the state F, when a high voltage is output from the terminal HO, the NMOS transistor 22 is turned on. When the NMOS transistor 22 is turned on while the resonant current Icr is flowing through the diode D2, the reverse recovery current flows through the diode D2, and thus the shoot-through current flows from the power supply side to the ground side as illustrated by a path Ph.

As such, the resonant current Icr in the positive direction flows when the NMOS transistor 22 is turned on. Thereafter, the NMOS transistor 22 is turned off, and when the resonant current Icr in the negative direction flows via the diode D1, the NMOS transistor 23 is turned on, thereby causing the shoot-through current to flow.

Further, the resonant current Icr in the negative direction flows upon turning on the NMOS transistor 23. Thereafter, the NMOS transistor 23 is turned off, and when the resonant current Icr in the positive direction flows via the diode D2, the NMOS transistor 22 is turned on, thereby causing the shoot-through current to flow.

Hereinafter, in an embodiment of the present disclosure, the case where the switching power supply circuit 10 is in "normal operation", where the resonant current Icr in the positive direction flows after the NMOS transistor 22 is turned on, and the resonant current Icr in the negative direction flows after the NMOS transistor 23 is turned on, is referred to as the switching power supply circuit 10 operating in a "mode A".

Although details will be described later, here, the phrase "after the NMOS transistor 22 (or the NMOS transistor 23) is turned on" indicates the timing after a predetermined time period has elapsed since the turning on of the NMOS transistor 22 (or the NMOS transistor 23).

==Shoot-Through Current that Occurs Upon Activation or the Like==

The foregoing shoot-through current may occur under transient conditions, other than in the normal operation of the switching power supply circuit 10, such as upon activation of the switching power supply circuit 10, sudden load change, or sudden change in the DC power supply Vdc, and the like. Here, with reference to FIGS. 5 and 6, the shoot-through current occurs upon activation of the switching power supply circuit 10 or the like will be described.

Figure 5:
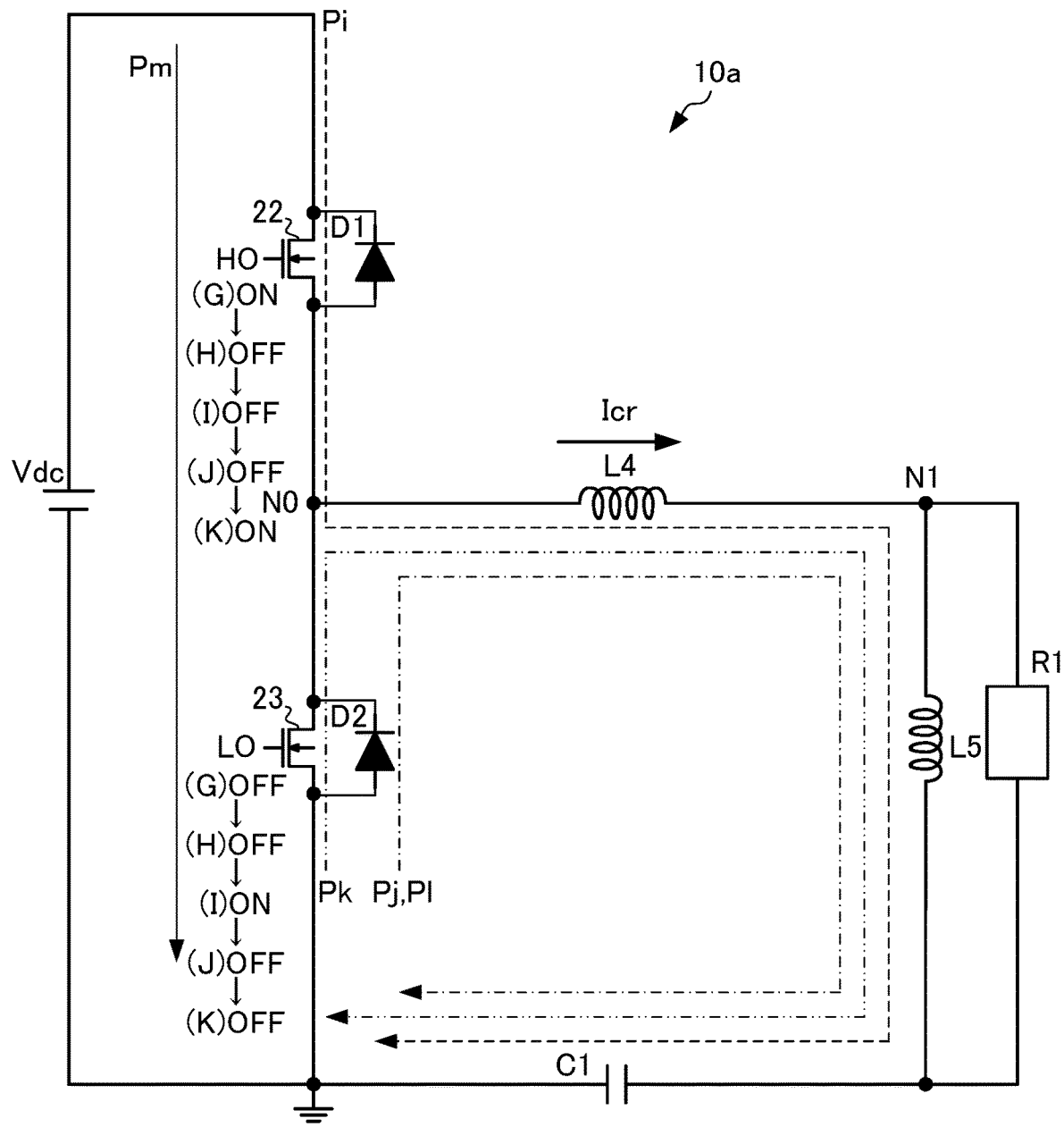

FIG. 5 is a diagram illustrating one example of the shoot-through current that flows, when the NMOS transistor 22 on the power supply side is turned on (state K), after the NMOS transistor 23 on the ground side is turned on (state I). Since the equivalent circuit 10a is the same as in FIGS. 2 and 3, the explanation thereof is omitted.

Figure 6:
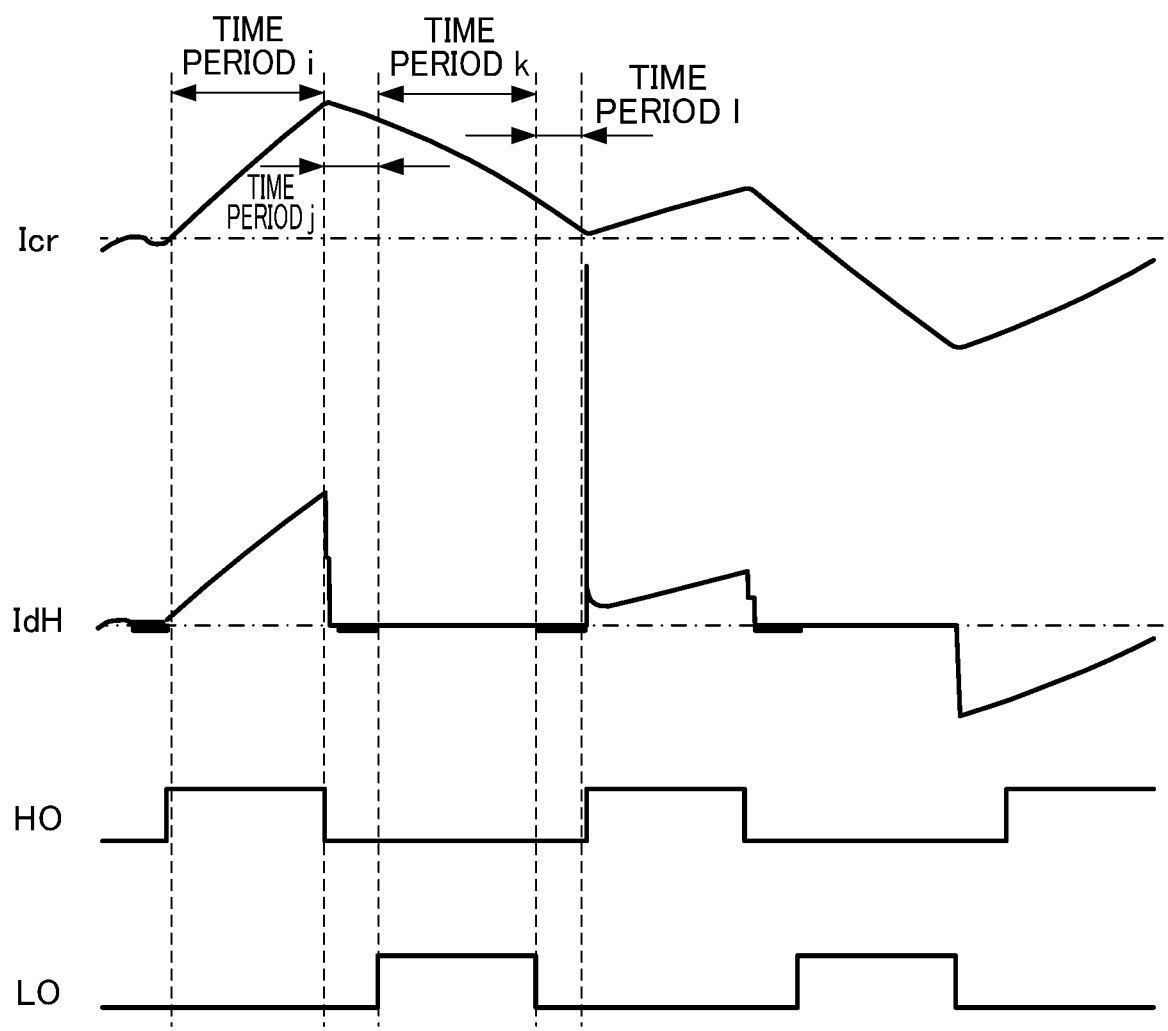
FIG. 6 is a diagram illustrating one example of a resonant current Icr, in a case where a shoot-through current flows when a resonant current Icr flows in a positive direction.

FIG. 6 is a diagram illustrating one example of the resonant current Icr in the case where the shoot-through current flows when the resonant current Icr flows in the positive direction. Immediately after activation of the switching power supply circuit 10, the capacitor C1 and parasitic capacitance generated in the switching power supply circuit 10 are not charted.

Thus, upon activation, the NMOS transistor 22 in FIG. 5 is turned on when a high voltage is output from the terminal HO in a state G, for example, which results in a significantly large current in the positive direction flowing to the capacitor C1 as illustrated by a path Pi. Note that in the state G, a low voltage is output from the terminal LO and the NMOS transistor 23 is off.

Accordingly, in a state H, a low voltage is output from the terminal HO and the NMOS transistor 22 is turned off, and then the resonant current Icr continues to flow in the positive direction via the diode D2 as illustrated by a path Pj.

Thereafter, even in the case where a high voltage is output from the terminal LO and the NMOS transistor 23 is turned on in the state I, the resonant current Icr flows as illustrated by a path Pk and maintains a positive value, as illustrated in FIG. 6.

Then, when a low voltage is output from the terminal LO in a state J while the resonant current Icr is flowing via the NMOS transistor 23 as illustrated by the path Pk, NMOS transistor 23 is turned off. As a result, the resonant current Icr flows to the node N0 via the diode D2 as illustrated by a path Pl.

Thereafter, as illustrated in FIG. 5, in a state K, when a high voltage is output from the terminal HO, the NMOS transistor 22 is turned on. When the NMOS transistor 22 is turned on while the resonant current Icr is flowing through the diode D2, the reverse recovery current flows through the diode D2, and thus the shoot-through current flows from the power supply side to the ground side as illustrated by a path Pm.

Note that, in FIG. 6, time periods i, j, k, l correspond to the paths Pi, Pj, Pk, Pl, respectively. Accordingly, in the time periods i, j, k, l, changes in the current value of the resonant current Icr when the resonant current Icr flows are separately illustrated for the paths Pi, Pj, Pk, Pl, respectively.

The shoot-through current in the case where the switching power supply circuit 10 is not in normal operation (for example, in the case of immediately after activation) has been described. In the case where the switching power supply circuit 10 does not operate normally, the output voltage Vout may suddenly rise from a DC voltage at the target level further due to a sudden drop in DC voltage Vdc or change in condition of the load 11.

The shoot-through current that may flow in such cases will be described below.

Figure 7:
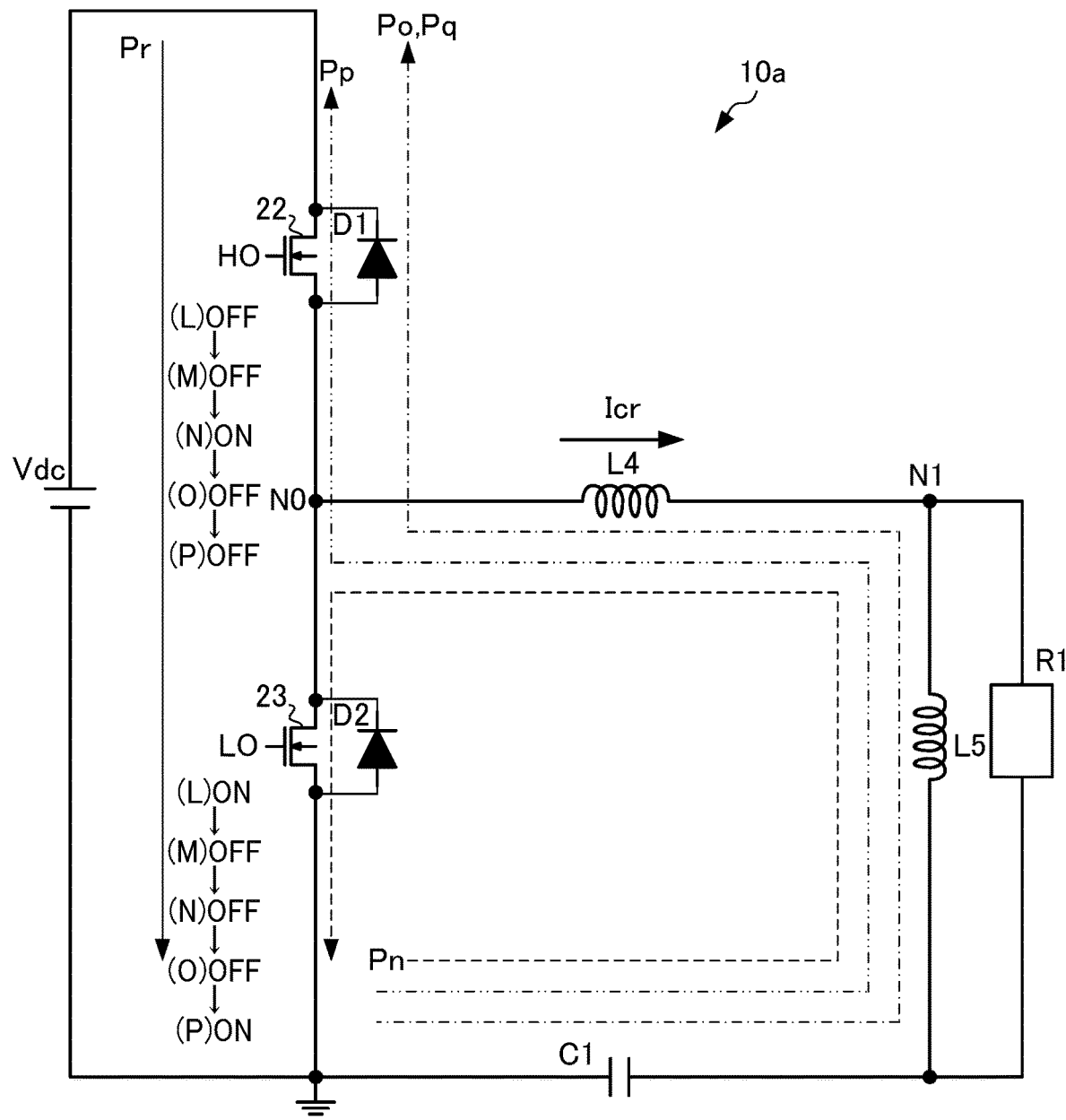

Note that FIG. 7 is a diagram illustrating one example of the shoot-through current that flows, when the NMOS transistor 23 on the ground side is turned on (state P), after the NMOS transistor 22 on the power supply side is turned on (state N). Since the equivalent circuit 10a is the same as in FIGS. 2, 3, and 5, the explanation thereof is omitted.

Figure 8:
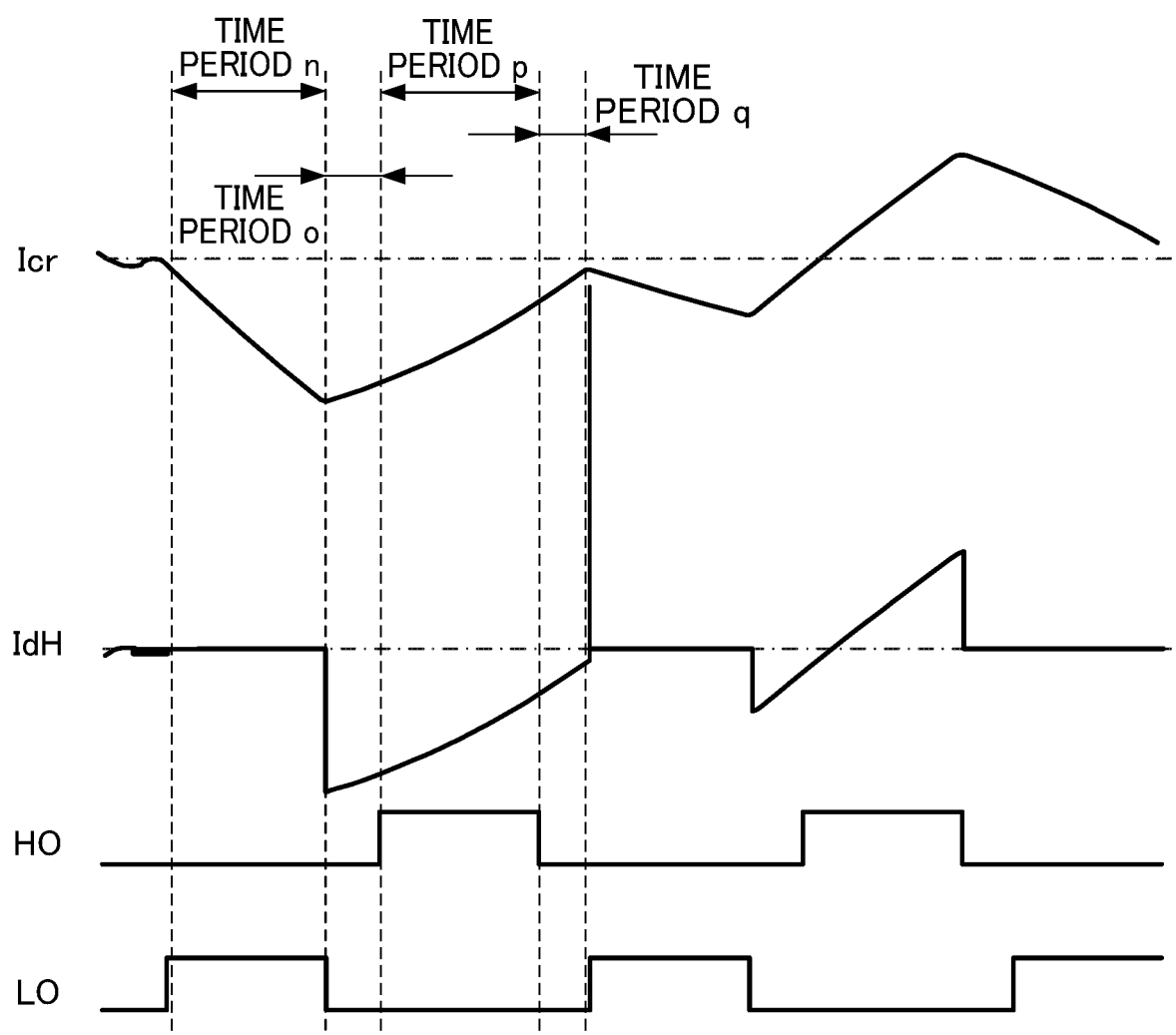
FIG. 8 is a diagram illustrating one example of a resonant current Icr in a case where a shoot-through current flows when a resonant current Icr flows in a negative direction.

FIG. 8 is a diagram illustrating one example of the resonant current Icr in the case where the shoot-through current flows when the resonant current Icr flows in the negative direction.

Incidentally, immediately after a sudden drop in the DC voltage Vdc or a sudden rise in the output voltage Vout, the output voltage Vout may become higher than the DC voltage Vdc. Thus, for example, in a state L, when a high voltage is output from the terminal LO, the NMOS transistor 23 in FIG. 7 is turned on, which results in the resonant current Icr in the negative direction flowing to the NMOS transistor 23 as illustrated by a path Pn. In the state L, a low voltage is output from the terminal HO and the NMOS transistor 22 is turned off.

Thereafter, in a state M, when a low voltage is output from the terminal LO, the NMOS transistor 23 is turned off, and then the resonant current Icr continues to flow in the negative direction via the diode D1 as illustrated by a path Po.

Thus, even in the case where a high voltage is output from the terminal HO and the NMOS transistor 22 is turned on in the state N, the resonant current Icr flows via the NMOS transistor 22 as illustrated by a path Pp and maintains a negative value.

Thereafter, in a state O, when a low voltage is output from the terminal HO and the NMOS transistor 22 is turned off, the resonant current Icr flows via the diode D1 as illustrated by a path Pq.

At this time, as illustrated in FIG. 7, in the state P, when a high voltage is output from the terminal LO, the NMOS transistor 23 is turned on. When the NMOS transistor 23 is turned on while the resonant current Icr is flowing through the diode D1, the reverse recovery current flows through the diode D1, and thus the shoot-through current flows from the power supply side to the ground side as illustrated by a path Pr.

Note that, in FIG. 8, time periods n, o, p, q correspond to the paths Pn, Po, Pp, Pq, respectively. Accordingly, in the time periods n, o, p, q, changes in the current value of the resonant current Icr when the resonant current Icr flows are separately illustrated for the paths Pn, Po, Pp, Pq, respectively.

As such, immediately after activation of the switching power supply circuit 10, the resonant current Icr in the positive direction flows when the NMOS transistor 23 is turned on. Thereafter the NMOS transistor 23 is turned off, and when the resonant current Icr in the positive direction flows via the diode D2, the NMOS transistor 22 is turned on, thereby causing the shoot-through current to flow.

In addition, when the NMOS transistor 22 is turned on due to a sudden drop in the DC voltage Vdc and/or a sudden rise in the output voltage Vout, the resonant current Icr in the negative direction flows. Thereafter, the NMOS transistor 22 is turned off, and when the resonant current Icr in the negative direction flows via the diode D1, the NMOS transistor 23 is turned on, thereby causing the shoot-through current to flow.

As has been described above, in the case where the switching power supply circuit 10 is in normal operation (or in the mode A), the resonant current Icr in the positive direction flows after the NMOS transistor 22 is turned on, and the resonant current Icr in the negative direction flows after the NMOS transistor 23 is turned on.

However, for example, upon activation of the switching power supply circuit 10, the resonant current Icr not in the negative direction but in the positive direction flows after the NMOS transistor 23 is turned on. In addition, in the case of a sudden change in the load of the switching power supply circuit 10 and/or the input power supply voltage Vdc, the resonant current Icr not in the positive direction but in the negative direction flows after the NMOS transistor 22 is turned on.

In an embodiment of the present disclosure, the case where the resonant current Icr in the negative direction flows after the NMOS transistor 22 is turned on, or the case where the resonant current Icr in the positive direction flows after the NMOS transistor 23 is turned on, is referred to as the switching power supply circuit 10 operating in a "mode B".

Accordingly, in the case where the switching power supply circuit 10 operates in the "mode B", the resonant current Icr flows in the same direction both in the state where the NMOS transistor 22 is turned on and in the state where the NMOS transistor 23 is turned on, thereby causing the shoot-through current to flow.

<<<Example of Control IC 40>>>

Figure 9:
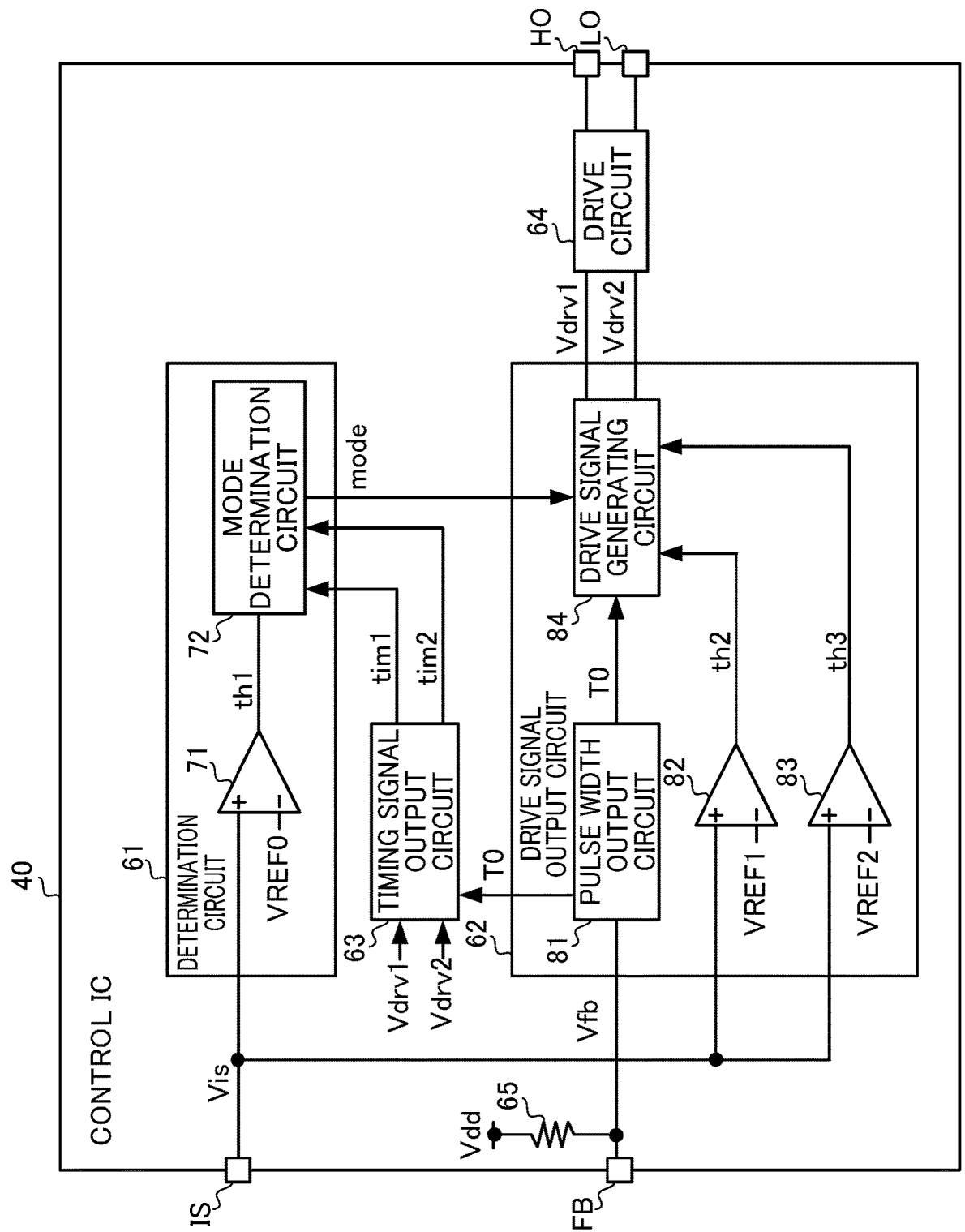
FIG. 9 is a diagram illustrating one example of a control IC 40.

FIG. 9 is a diagram illustrating one example of the control IC 40. The control IC 40 is a circuit that switches the NMOS transistors 22, 23 based on the voltage Vis and the voltage Vfb, and comprises a determination circuit 61, a drive signal output circuit 62, a timing signal output circuit 63, a drive circuit 64, and a resistor 65.

Note that the resistor 65 is a resistor for pulling up the terminal FB from a power supply voltage Vcc to a voltage Vdd generated by an internal circuit (not illustrated), and generates the voltage Vfb that changes with the bias current I1 of the phototransistor 51.

The determination circuit 61 determines the operation mode of the switching power supply circuit 10 based on whether the voltage Vis corresponding to the resonant current Icr is higher or lower than a reference voltage VREF0, upon receiving timing signals tim1, tim2 from the timing signal output circuit 63 (described later). The determination circuit 61 comprises a comparator 71 and a mode determination circuit 72.

The comparator 71 compares the voltage Vis corresponding to the resonant current Icr with the reference voltage VREF0 for detecting the direction of the resonant current Icr, and outputs a signal th1 indicating the direction of the resonant current Icr. Here, the level of the reference voltage VREF0 is the level of the voltage Vis at the time of the resonant current Icr being zero.

Then, the comparator 71 outputs the high signal th1 indicating that the direction of the resonant current Icr is positive, when the voltage Vis is higher than the reference voltage VREF0. On the other hand, the comparator 71 outputs the low signal th1 indicating that the direction of the resonant current Icr is negative, when the voltage Vis is smaller than the reference voltage VREF0.

The mode determination circuit 72 determines that the switching power supply circuit 10 operates in the "mode A" when receiving the high signal th1, and the switching power supply circuit 10 operates in the "mode B" when receiving the low signal th1, at the rising edge of the timing signal tim1.

On the other hand, the mode determination circuit 72 determines that the switching power supply circuit 10 operates in the "mode A" when receiving the low signal th1, and that the switching power supply circuit 10 operates in the "mode B" when receiving the high signal th1, at the rising edge of the timing signal tim2.

In addition, the mode determination circuit 72 outputs a high signal mode when the switching power supply circuit 10 operates in the "mode A", and outputs a low signal mode when the switching power supply circuit 10 operates in the "mode B".

The drive signal output circuit 62 outputs drive signals Vdrv1, Vdrv2 based on the signal mode, the voltage Vis, and the voltage Vfb, and comprises a pulse width output circuit 81, comparators 82, 83, and a drive signal generating circuit 84.

The pulse width output circuit 81 outputs information indicating a "pulse width T0" of the drive signal Vdrv1, Vdrv2 for causing the output voltage Vout to reach the target level based on the voltage Vfb corresponding to the output voltage Vout.

The pulse width output circuit 81 according to an embodiment of the present disclosure includes a counter for outputting a count value that changes according to the voltage Vfb, for example. However, the pulse width output circuit 81 may execute a predetermined arithmetic processing and output information indicating the "pulse width T0" according to the voltage Vfb.

The comparator 82 is a circuit that detects timing immediately before the direction of the resonant current Icr changes from the positive direction to the negative direction. Specifically, the comparator 82 compares the voltage Vis with a reference voltage VREF1 indicating the voltage Vis corresponding to the resonant current Icr in the positive direction that is close to zero, and outputs a low signal th2 when the resonant current Icr approaches zero. On the other hand, the voltage Vis corresponding to the resonant current Icr in the positive direction is higher than the reference voltage VREF1, the comparator 82 outputs a high signal th2.

The comparator 83 is a circuit that detects timing immediately before the resonant current Icr changes from the negative direction to the positive direction.

Specifically, the comparator 83 compares the voltage Vis with a reference voltage VREF2 indicating the voltage Vis corresponding to the resonant current Icr in the negative direction that is close to zero, and outputs a high signal th3 when the resonant current Icr approaches zero. On the other hand, the voltage Vis corresponding to the resonant current Icr in the negative direction is lower than the reference voltage VREF2, the comparator 83 outputs a low signal th3. In an embodiment of the present disclosure, it is assumed that a magnitude relationship among the reference voltages VREF0, VREF1, and VREF2 is VREF1>VREF0>VREF2.

As such, in an embodiment of the present disclosure, the timing immediately before the resonant current Icr changes from positive to negative and the timing immediately before the resonant current Icr changes from negative to positive are detected using the reference voltages VREF1, VREF2. In an embodiment of the present disclosure, it is assumed that the reference voltage VREF1 and the reference voltage VREF2 have the same magnitude but may have different magnitudes. In addition, the reference voltages VREF1, VREF2 may change according to the DC power supply Vdc.

The drive signal generating circuit 84 outputs the drive signals Vdrv1, Vdrv2 based on the "pulse width T0", the signal mode, and the signals th2, th3. Specifically, the drive signal generating circuit 84 outputs the drive signals Vdrv1, Vdrv2 having the "pulse width T0" when the signal mode indicates the "mode A". However, in the case where the switching power supply circuit 10 operates in the mode A and continues to output the drive signals Vdrv1, Vdrv2 having the "pulse width T0" for causing the output voltage Vout to reach the target level, the shoot-through current may occur as described above.

Thus, the drive signal generating circuit 84 may generate the drive signals Vdrv1, Vdrv2 having a pulse width shorter than the "pulse width T0" to reduce the shoot-through current, when the switching power supply circuit 10 operates in the mode A.

Specifically, while the drive signal generating circuit 84 is outputting the drive signals Vdrv1, Vdrv2 having the "pulse width T0", and when the resonant current Icr becomes substantially zero, in other words, when receiving the low signal th2 and the high signal th3, the drive signal generating circuit 84 changes the output drive signals to low. Note that the drive signal generating circuit 84 has a predetermined dead time, and outputs the drive signals Vdrv1, Vdrv2 in a complementary manner.

In addition, the drive signal generating circuit 84 causes one of the drive signals Vdrv1, Vdrv2 to be high based on the "pulse width T0" when the signal mode indicates the "mode B", and changes it to low after a lapse of the "pulse width T0".

However, when the switching power supply circuit 10 operates in the mode B, the shoot-through current occurs as describes above. Thus, the drive signal generating circuit 84 generates the drive signals Vdrv1, Vdrv2 so that the dead time is extended to reduce the shoot-through current when the switching power supply circuit 10 operates in the mode B.

Specifically, the drive signal generating circuit 84 outputs the low drive signal Vdrv2 until the resonant current Icr flows in the positive direction, in other words, until receiving the high signal th2, after the dead time has elapsed since the drive signal Vdrv1 goes low. On the other hand, the drive signal generating circuit 84 outputs the low drive signal Vdrv1 until the resonant current Icr flows in the negative direction, in other words, until receiving the low signal th3, after the dead time has elapsed since the drive signal Vdrv2 goes low.

In an embodiment of the present disclosure, a time period in which the dead time is extended as described above is determined by the signals th2, th3. However, this may be determined by the timing at which the signal th1 changes (for example, the timing at which the signal th1 changes from high to low, or the timing at which the signal th1 changes from low to high).

The timing signal output circuit 63 generates the timing signal tim1 when the drive signal Vdrv1 is high, and generates the timing signal tim2 when the drive signal Vdrv2 is high, based on the "pulse width T0" from the pulse width output circuit 81. The generation of the timing signals tim1, tim2 will be described later.

The drive circuit 64 drives the NMOS transistors 22, 23 in response to the drive signals Vdrv1, Vdrv2. Specifically, the drive circuit 64 outputs the high signal Vdr1 from the terminal HO in response to receiving the high drive signal Vdrv1, and outputs the low signal Vdr1 from the terminal HO in response to receiving the low drive signal Vdrv1.

In addition, the drive circuit 64 outputs the high signal Vdr2 from the terminal LO in response to receiving the high drive signal Vdrv2, and outputs the low signal Vdr2 from the terminal LO in response to receiving the low drive signal Vdrv2. Note that the comparator 71 corresponds to a "first detection circuit".

<<<Explanation of Timing at Which Timing Signals tim1, tim2 are Generated>>>

Figure 10:
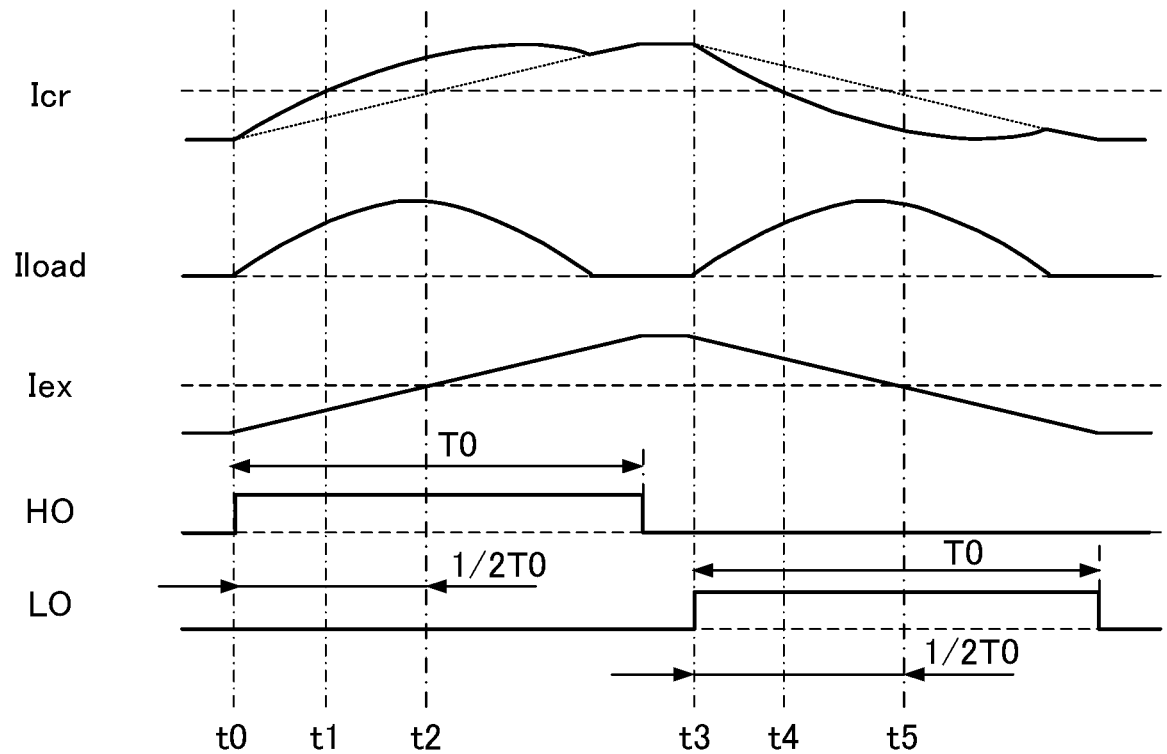
FIG. 10 is a diagram illustrating one example of timing at which a timing signal output circuit 63 generates timing signals tim1, tim2.

FIG. 10 is a diagram illustrating one example of timing at which the timing signal output circuit 63 generates the timing signals tim1, tim2. Note that, here, a waveform of the resonant current Icr when the switching power supply circuit 10 is in normal operation is illustrated.

First, at time t0, the high signal is output from the terminal HO. At time t1, the resonant current Icr changes from the negative direction to the positive direction. Here, the resonant current Icr is the sum of a load current Iload and an excitation current Iex. Thus, the load current Iload decreases as the load 11 becomes a light load condition. This further delays the position of time t1. Accordingly, in the case where the switching power supply circuit 10 is in normal operation, time t1 delays the most when no load current Iload flows.

In addition, at time t2, the excitation current Iex changes from the negative direction to the positive direction. Switching frequency is determined based on the voltage Vfb corresponding to the output voltage Vout. Assuming that the NMOS transistors 22, 23 have 50% on-duty cycle, time t2 at which the excitation current Iex changes from the negative direction to the positive direction results in a position (the center of the pulse width T0) at which a time period of ½T0 has elapsed since the "pulse width T0" goes high.

Here, in the case where the resonant current Icr does not change from the negative direction to the positive direction at the center of the "pulse width T0", the average voltage of the capacitor 21 is equal to or lower than a half of the DC power supply Vdc upon activation of the switching power supply circuit 10 or the like.

Accordingly, in the "pulse width T0", the timing signal tim1 is generated at time t2 which is the center of the "pulse width T0", and the direction of the resonant current Icr is determined, thereby being able to determine the "mode A" or the "mode B". In addition, the timing at which the timing signal tim1 is generated may be at or after ½ (at or after the center) of the "pulse width T0".

In addition, the timing signal tim2 is generated similarly to the timing signal tim1. The timing at which the timing signal tim2 is generated will be described below.

At time t3 corresponding to time t0, the high signal is output from the terminal LO, and at time t4 corresponding to time t1, the resonant current Icr changes from the positive direction to the negative direction. Then, at time t5 corresponding to time t2, the excitation current Iex changes from the positive direction to the negative direction.

Here, in the "pulse width T0", at time t5 which is the center of the "pulse width T0", the timing signal tim2 is generated, and the direction of the resonant current Icr is determined, thereby being able to determine the "mode A" or the "mode B", similarly to the timing signal tim1. In addition, the timing at which the timing signal tim2 is generated may be at or after ½ (at or after the center) of the "pulse width T0", similarly to the timing signal tim1.

Note that the NMOS transistor 22 corresponds to a "first switching device", and the NMOS transistor 23 corresponds to a "second switching device". Further, the timing signal tim1 corresponds to a "first timing signal", and the timing signal tim2 corresponds to a "second timing signal". Further, the mode B corresponds to a "first mode", and the mode A corresponds to a "second mode". The reference voltage VREF1, VREF2 corresponds to a "first predetermined value" or a "second predetermined value". Further, the timing at which the timing signal tim1 is output corresponds to a "first timing", and the timing at which the timing signal tim2 is output corresponds to a "second timing".

<<<Explanation of Flowchart of Operation of Control IC 40>>>

Figure 11:
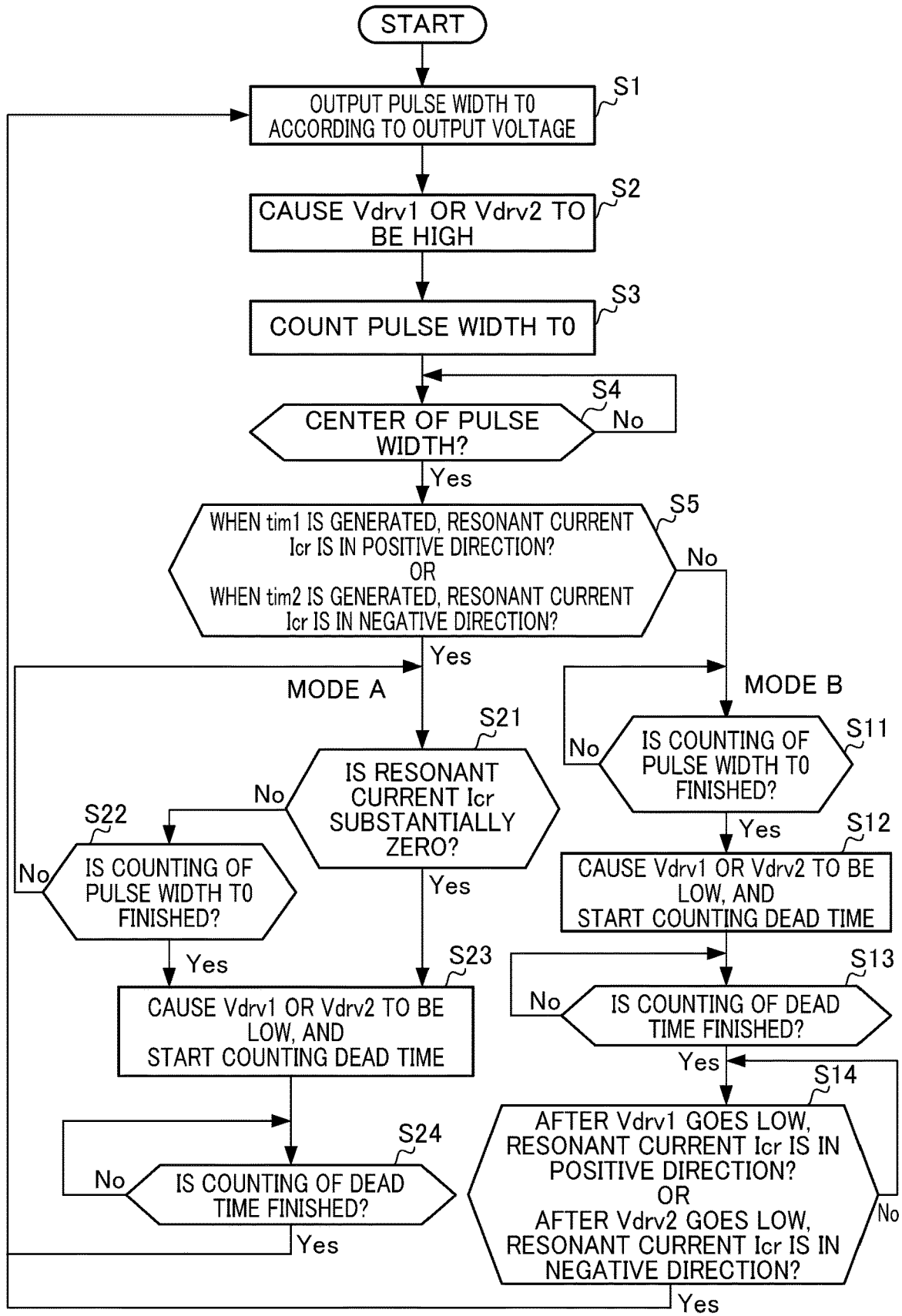
FIG. 11 is a diagram of a flowchart illustrating one example of an operation of a control IC 40.

FIG. 11 is a diagram of a flowchart illustrating one example of the operation of the control IC 40.

First, an outline of the operation of the control IC 40 in the mode A or B will be given. In the case where the switching power supply circuit 10 operates in the mode A, and when the comparators 82, 83 indicate that the resonant current Icr approaches zero, the control IC 40 turns off one of the NMOS transistors 22 and 23 that is on, and after a lapse of the dead time, turns on the other of the NMOS transistors 22 and 23. Note that, in order to detect whether the resonant current Icr approaches zero, the drive signal generating circuit 84 determines whether the signal th2 is low as well as the signal th3 is high.

Next, in the case where the switching power supply circuit 10 operates in the mode B, the dead time is extended until the resonant current Icr approaches zero after a lapse of the dead time after one of the NMOS transistors 22 and 23 is turned on during the "pulse width T0". Then, when the comparators 82, 83 indicate that the resonant current Icr approaches zero, the control IC 40 turns on the other of the NMOS transistors 22 and 23.

The detailed operation of the control IC 40 relating to the foregoing operation will be explained below using the flowchart.

==Mode Determination Operation==

First, the pulse width output circuit 81 outputs the "pulse width T0" according to the voltage Vfb that corresponds to the output voltage Vout (S1). Then, the drive signal generating circuit 84 causes the drive signal Vdrv1 or Vdrv2 to be high (S2). Thereafter, the drive signal generating circuit 84 and the timing signal output circuit 63 count the "pulse width T0" that is high (S3).

The timing signal output circuit 63 determines whether the pulse duration of the drive signal Vdrv1 or Vdrv2 has reached the center of the "pulse width T0" (S4). When the pulse duration of the drive signal Vdrv1 or Vdrv2 has not reached the center of the "pulse width T0" (S4: No), the timing signal output circuit 63 continues to determine whether the pulse duration of the drive signal Vdrv1 or Vdrv2 has reached the center of the "pulse width T0" (S4).

When the pulse width duration has reached the center of the "pulse width T0" (S4: Yes), the mode determination circuit 72 determines whether the resonant current Icr flows in the positive direction, in other words, whether the comparator 71 outputs the high signal th1, upon generation of the timing signal tim1 (S5). Alternatively, when the pulse width duration has reached the center of the "pulse width T0" (S4: Yes), the mode determination circuit 72 determines whether the resonant current Icr flows in the negative direction, in other words, whether the comparator outputs the low signal th1, upon generation of the timing signal tim2 (S5).

The mode determination circuit 72 determines that the switching power supply circuit 10 operates in the mode A when the resonant current Icr flows in the positive direction, in other words, when the signal th1 is high, upon generation of the timing signal tim1 (S5: Yes). Further, the mode determination circuit 72 determines that the switching power supply circuit 10 operates in the mode A when the resonant current Icr flows in the negative direction, in other words, when the signal th1 is low, upon generation of the timing signal tim2 (S5: Yes).

On the other hand, the mode determination circuit 72 determines that the switching power supply circuit 10 operates in the mode B when the resonant current Icr flows in the negative direction, in other words, when the signal th1 is low, upon generation of the timing signal tim1 (S5: No). Further, the mode determination circuit 72 determines that the switching power supply circuit 10 operates in the mode B when the resonant current Icr flows in the positive direction, in other words, when the signal th1 is high, upon generation of the timing signal tim2 (S5: No).

==Operation when the Switching Power Supply Circuit 10 Operates in Mode B==

When the switching power supply circuit 10 operates in the mode B (S5: No), the drive signal generating circuit 84 determines whether counting of the "pulse width T0" is finished (S11).

When counting of the "pulse width T0" is not finished (S11: No), the drive signal generating circuit 84 continues to determine whether counting of the "pulse width T0" is finished (S11). When counting of the "pulse width T0" is finished (S11: Yes), the drive signal generating circuit 84 causes the drive signal Vdrv1 or Vdrv2 to be low, and starts counting the dead time (S12).

The drive signal generating circuit 84 determines whether counting of the dead time is finished (S13). When counting of the dead time is not finished (S13: No), the drive signal generating circuit 84 continues to determine whether counting of the dead time is finished (S13).

When counting of the dead time is finished (S13: Yes), the drive signal generating circuit 84 determines whether the resonant current Icr flows in the positive direction, in other words, whether the comparator 82 outputs the high signal th2, after the drive signal Vdrv1 goes low (S14). Alternatively, the drive signal generating circuit 84 determines whether the resonant current Icr flows in the negative direction, in other words, whether the comparator 83 outputs the low signal th3, after the drive signal Vdrv2 goes low (S14).

In the case where the signal th2 is low after the drive signal Vdrv1 goes low, or the signal th3 is high after the drive signal Vdrv2 goes low (S14: No), the drive signal generating circuit 84 continues the dead time (S14). At this time, the resonant current Icr gradually approaches substantially zero.

In the case where the signal th2 is high after the drive signal Vdrv1 goes low, or the signal th3 is low after the drive signal Vdrv2 goes low (S14: Yes), the pulse width output circuit 81 outputs the "pulse width T0" according to the voltage Vfb that corresponds to the output voltage Vout (S1). At this time, the resonant current Icr flows in the positive direction after the drive signal Vdrv1 goes low, and flows in the negative direction after the drive signal Vdrv2 goes low.

As such, in the case where the switching power supply circuit 10 operates in the mode B, the drive signal generating circuit 84 turns on the NMOS transistor 23 on the ground side, when the resonant current Icr in the negative direction increases to a positive value (reference voltage VREF1) that is close to zero. By driving the NMOS transistor 23 on the ground side after the resonant current Icr becomes positive using such driving, it is possible to reliably reduce the shoot-through current. In the case where the switching power supply circuit 10 operates in the mode B, the drive signal generating circuit 84 turns on the NMOS transistor 22 on the power supply side, when the resonant current Icr in the positive direction decreases to a negative value (reference voltage VREF2) that is close to zero. Similarly, by driving the NMOS transistor 22 on the power supply side after the resonant current Icr becomes negative using such driving, it is possible to reliably reduce the shoot-through current.

Accordingly, in the case where the switching power supply circuit 10 operates in the mode B and the resonant current Icr in the negative direction increases, the "first predetermined value" results in the magnitude of the resonant current Icr being a positive value (value corresponding to the reference voltage VREF1) that is close to zero. On the other hand, in the case where the switching power supply circuit 10 operates in the mode B and the resonant current Icr in the positive direction decreases, the "first predetermined value" results in the magnitude of the resonant current Icr being a negative value (value corresponding to the reference voltage VREF2) that is close to zero. Note that a "third predetermined value" results in the current value of the resonant current Icr being the negative value (value corresponding to the reference voltage VREF2) that is close to zero.

Note that, in the case where the switching power supply circuit 10 operates in the mode B, the same effects can be obtained even if the "first predetermined value" is the magnitude of the resonant current Icr being a value indicating zero (value corresponding to the reference voltage VREF0).

In addition, the "magnitude of the resonant current" corresponds to the absolute value of the resonant current Icr, and whether the resonant current Icr has become in the positive direction or the negative direction may be determined at least based on whether the absolute value of the resonant current Icr is smaller than a predetermined value.

==Operation in the Case Where Switching Power Supply Circuit 10 Operates in the Mode A==

In the case where the switching power supply circuit operates in the mode A (S5: Yes), the drive signal generating circuit 84 determines whether the resonant current Icr is substantially zero, in other words, whether the comparator 82 outputs the low signal th2 and the comparator 83 outputs the high signal th3 (S21).

In an embodiment of the present disclosure, the signals th2, th3 are used to determine whether the resonant current Icr is substantially zero. However, whether the resonant current Icr is substantially zero may be determined at the timing at which the signal th1 changes (for example, the timing at which the signal th1 changes from high to low, or the timing at which the signal th1 changes from low to high).

In addition, the "magnitude of the resonant current" corresponds to the absolute value of the resonant current Icr, and whether the resonant current Icr is substantially zero may be determined based on whether the absolute value of the resonant current Icr is smaller than a predetermined value.

In the case where the comparator 82 outputs the high signal th2 or the comparator 83 outputs the low signal th3 (S21: No), the drive signal generating circuit 84 determines whether counting of the "pulse width T0" is finished (S22).

When counting of the "pulse width T0" is not finished (S22: No), the drive signal generating circuit 84 determines whether the resonant current Icr is substantially zero, in other words, whether the comparator 82 outputs the low signal th2 and the comparator 83 outputs the high signal th3 (S21). When counting of the "pulse width T0" is finished (S22: Yes), or when the comparator 82 outputs the low signal th2 and the comparator 83 outputs the high signal th3 (S21: Yes), the drive signal generating circuit 84 causes the drive signal Vdrv1 or Vdrv2 to be low, and starts counting the dead time (S23).

Accordingly, in the case where the switching power supply circuit 10 operates in the mode A, the drive signal generating circuit 84 turns off the NMOS transistor 22 on the power supply side, when the resonant current Icr in the positive direction decreases to the positive value (reference voltage VREF1) that is close to zero. Note that in the case where the switching power supply circuit 10 operates in the mode A, the drive signal generating circuit 84 turns off the NMOS transistor 23 on the ground side, when the resonant current Icr in the negative direction increases to the negative value (reference voltage VREF2) that is close to zero.

Accordingly, in the case where the switching power supply circuit 10 operates in the mode A and the resonant current Icr in the positive direction decreases, the "second predetermined value" results in the magnitude of the resonant current Icr being the positive value (value corresponding to the reference voltage VREF1) that is close to zero. On the other hand, in the case where the switching power supply circuit 10 operates in the mode A and the resonant current Icr in the negative direction increases, the "second predetermined value" results in the magnitude of the resonant current Icr being the negative value (value corresponding to the reference voltage VREF2) that is close to zero. Note that a "fourth predetermined value" results in the current value of the resonant current Icr being the negative value (value corresponding to the reference voltage VREF2) that is close to zero.

Note that, in the case where the switching power supply circuit 10 operates in the mode A, the same effects can be obtained even if the "second predetermined value" is the magnitude of the resonant current Icr being the value indicating zero (value corresponding to the reference voltage VREF0).

Thereafter, the drive signal generating circuit 84 determines whether counting of the dead time is finished (S24). When counting of the dead time is not finished (S24: No), the drive signal generating circuit 84 continues to determine whether counting of the dead time is finished (S24). When counting of the dead time is finished (S24: Yes), the pulse width output circuit 81 outputs the "pulse width T0" according to the voltage Vfb that corresponds to the output voltage Vout (S1).

<<<Operation of Switching Power Supply Circuit 10 Upon Activation>>>

Figure 12:
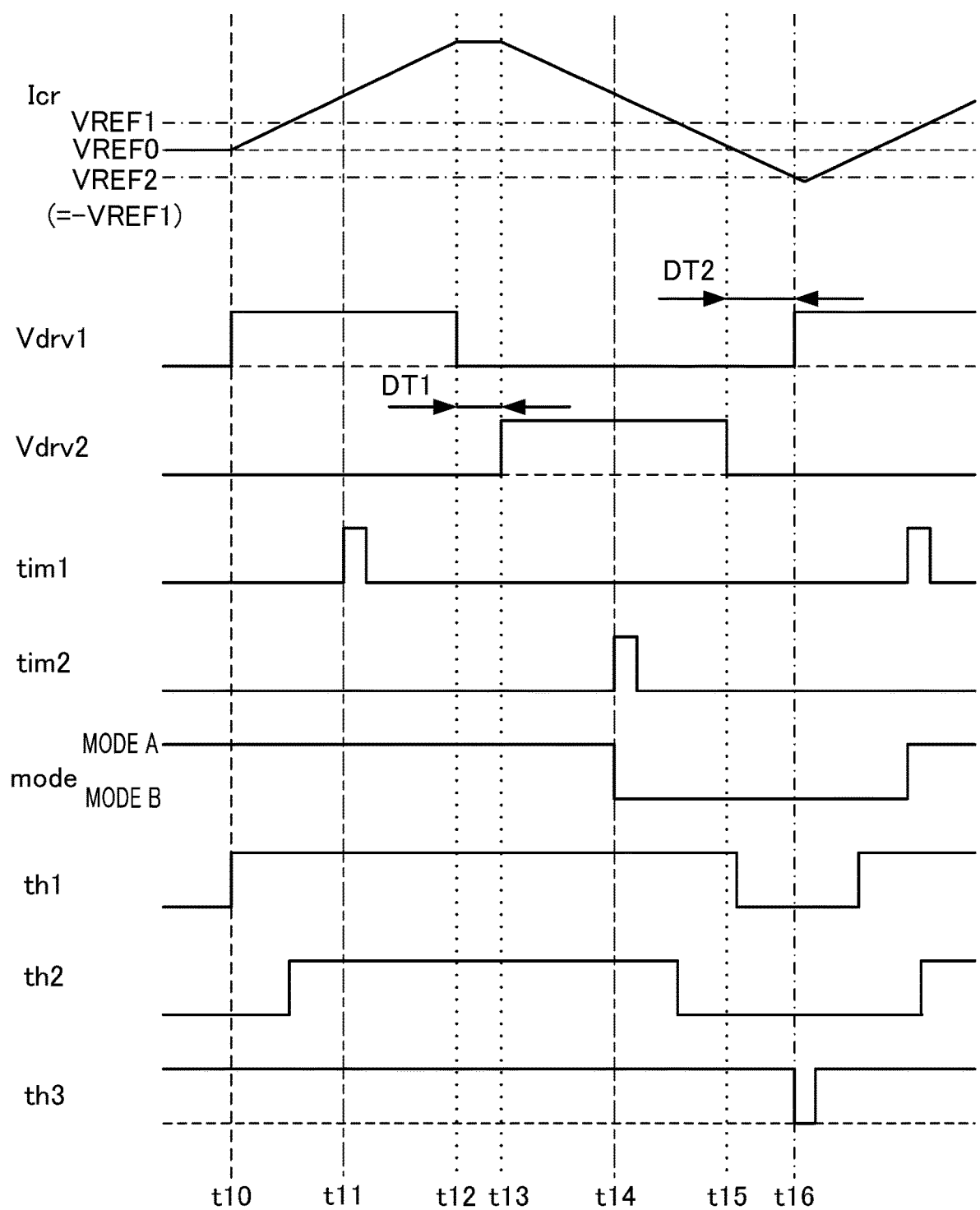
FIG. 12 is a diagram of a timing chart illustrating one example of an operation of a control IC 40 upon activation of a switching power supply circuit 10.

FIG. 12 is a diagram of a timing chart illustrating one example of the operation of the control IC 40 upon activation of the switching power supply circuit 10. Note that FIG. 12 is a diagram for explaining the operation of the control IC 40 for reducing the shoot-through current when the switching power supply circuit 10 operates, which has been explained with reference to FIGS. 5 and 6. The operation of the control IC 40 for reducing the shoot-through current when the switching power supply circuit 10 operates, which has been explained with reference to FIGS. 7 and 8, is similar, and thus the explanation thereof is omitted.

The comparators 71, 82, 83 operate as explained with reference to FIG. 9. Accordingly, the timings at which the signals th1, th2, th3 change, which are used for explaining the operation of the control IC 40, are given times, and only the states of the signals th1, th2, th3 at these specific times will be explained below.

It is assumed that the switching power supply circuit 10 is not activated yet before time t10 and the mode determination circuit 72 according to an embodiment of the present disclosure outputs a mode signal indicating the mode A as an initial value.

At time t10 at which the switching power supply circuit 10 is activated, the drive signal generating circuit 84 outputs the high drive signal Vdrv1.

At time t11, the timing signal output circuit 63 outputs the timing signal tim1 indicating that the pulse duration of the high drive signal Vdrv1 has reached the center of the "pulse width T0". At this time, the comparator 71 is outputting the high signal th1 and the resonant current Icr in the positive direction is flowing, and thus the mode determination circuit 72 outputs the mode signal indicating the mode A.

At time t12 at which the "pulse width T0" has elapsed since time t10, the drive signal generating circuit 84 outputs the low drive signal Vdrv1.

At time t13 at which a dead time DT1 has elapsed since time t12, the drive signal generating circuit 84 outputs the high drive signal Vdrv2. Note that, at time t13, the dead time DT1 is a predetermined dead time, and will not be extended in response to the signal mode indicating that the switching power supply circuit 10 operates in the mode A.

At time t14, the timing signal output circuit 63 outputs the timing signal tim2 indicating that the pulse duration of the high drive signal Vdrv2 has reached the center of the "pulse width T0". At this time, the comparator 71 outputs the high signal th1 and the resonant current Icr in the positive direction flows, and thus the mode determination circuit 72 outputs the mode signal indicating the mode B.

At time t15 at which the "pulse width T0" has elapsed since time t13, the drive signal generating circuit 84 outputs the low drive signal Vdrv2.

At time t16 at which a dead time DT2 has elapsed since time t15, the comparator 83 outputs the low signal th3 indicating that the resonant current Icr flows in the negative direction, in other words, the magnitude of the voltage Vis corresponding to the resonant current Icr becomes lower than the reference voltage VREF2.

The drive signal generating circuit 84 outputs the high drive signal Vdrv1 in response to the signal mode indicating that the switching power supply circuit 10 operates in the mode B and the low signal th3. Note that, at time t16, the dead time DT2 is extended in response to the signal mode indicating that the switching power supply circuit 10 operates in the mode B, and is longer than the predetermined dead time. Thus, in an embodiment of the present disclosure, it is possible to reduce the occurrence of the shoot-through current which have been explained with reference to FIG. 6.

<<<Case Where Switching Power Supply Circuit 10 is in Normal Operation>>>

Figure 13:
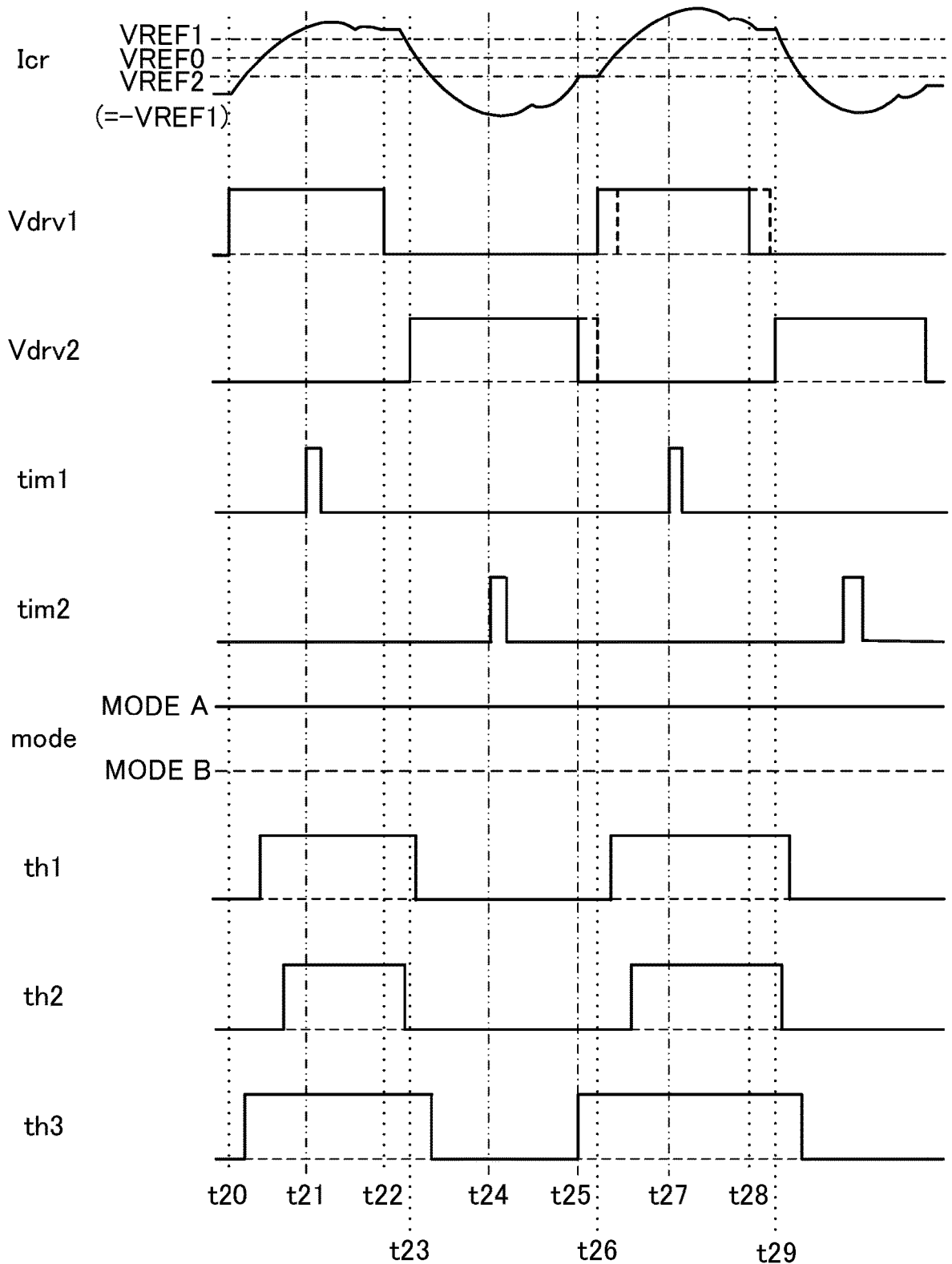
FIG. 13 is a diagram of a timing chart illustrating one example of an operation of a control IC 40 in a case where a switching power supply circuit 10 is in normal operation.

FIG. 13 is a diagram of a timing chart in the case where the switching power supply circuit 10 is in normal operation. Note that FIG. 13 is a diagram for explaining the operation of the control IC 40 for reducing the shoot-through current when the switching power supply circuit 10 operates, which has been explained with reference from FIGS. 2 to 4. Note that, similarly to the case of FIG. 12, the timings at which the signals th1, th2, th3 change, which are used for explaining the operation of the control IC 40, are given times, and only the states of the signals th1, th2, th3 at these specific times will be explained below.

It is assumed that, before time t20, the resonant current Icr in the negative direction flows while the high drive signal Vdrv2 is output, and the mode determination circuit 72 outputs the mode signal indicating the mode A.

At time t20, the drive signal generating circuit 84 outputs the high drive signal Vdrv1.

At time t21, the timing signal output circuit 63 outputs the timing signal tim1 indicating that the pulse duration of the high drive signal Vdrv1 has reached the center of the "pulse width T0". At this time, the comparator 71 is outputting the high signal th1 and the resonant current Icr in the positive direction is flowing, and thus the mode determination circuit 72 outputs the mode signal indicating the mode A.

At time t22 at which the "pulse width T0" has elapsed since time t20, the drive signal generating circuit 84 outputs the low drive signal Vdrv1.

At time t23 at which a predetermined dead time has elapsed since time t22, the drive signal generating circuit 84 outputs the high drive signal Vdrv2.

At time t24, the timing signal output circuit 63 outputs the timing signal tim2 indicating that the pulse duration of the high drive signal Vdrv2 has reached the center of the "pulse width T0". At this time, the comparator 71 is outputting the low signal th1 and the resonant current Icr in the negative direction is flowing, and thus the mode determination circuit 72 outputs the mode signal indicating the mode A.

At time t25, the comparator 83 outputs the high signal th3 indicating that the resonant current Icr approaches zero, in other words, the magnitude of the voltage Vis corresponding to the resonant current Icr becomes higher than the reference voltage VREF2.

The drive signal generating circuit 84 outputs the low drive signal Vdrv2 in response to the signal mode indicating that the switching power supply circuit 10 operates in the mode A and the high signal th3.

As such, at time t25, the pulse width of the drive signal Vdrv2 is shortened in response to the signal mode indicating that the switching power supply circuit 10 operates in the mode A. Accordingly, it is possible to prevent the resonant current Icr from flowing in the positive direction when the drive signal Vdrv2 is high, thereby reducing the occurrence of the shoot-through current.

At time t26 at which the predetermined dead time has elapsed since time t25, the drive signal generating circuit 84 outputs the high drive signal Vdrv1. Note that, at time t26, after the drive signal Vdrv2 is shortened, the high drive signal Vdrv1 is output earlier by such a shortened amount.

At time t27, the timing signal output circuit 63 outputs the timing signal tim1 indicating that the pulse duration of the high drive signal Vdrv1 has reached the center of the "pulse width T0". At this time, the comparator 71 is outputting the high signal th1 and the resonant current Icr in the positive direction is flowing, and thus the mode determination circuit 72 outputs the mode signal indicating the mode A.

At time t28 at which the "pulse width T0" has elapsed since time t26, the drive signal generating circuit 84 outputs the low drive signal Vdrv1.

At time t29 at which the predetermined dead time has elapsed since time t28, the drive signal generating circuit 84 outputs the high drive signal Vdrv2.

===Summary===

(1) The switching power supply circuit 10 according to an embodiment of the present disclosure has been described hereinabove. The determination circuit 61 determines whether the switching power supply circuit 10 operates in the mode A or the mode B of the operation mode based on the resonant current Icr of the switching power supply circuit 10. In addition, the drive signal output circuit 62 outputs the drive signals Vdrv1, Vdrv2 for switching the NMOS transistor 22 and the NMOS transistor 23 based on the determined operation mode so that the shoot-through current does not flow through the NMOS transistor 22 or the NMOS transistor 23. The determination circuit 61 determines the operation mode based on the resonant current Icr, thereby being able to provide the switching control circuit that effectively reduces the shoot-through current regardless of the operation of the switching power supply circuit 10.

(2) In addition, the determination circuit 61 determines the operation mode based on the resonant current Icr at a predetermined timing in the "pulse width T0" during which the NMOS transistor 22 is on, thereby being able to determine the operation mode of the switching power supply circuit 10 one by one.

(3) In addition, the determination circuit 61 determines the operation mode based on the resonant current Icr at the predetermined timing and the resonant current Icr at the second predetermined timing in the "pulse width T0" during which the NMOS transistor 23 is on, thereby being able to reliably determine the operation mode.

(4) In addition, the predetermined timing is the timing at or after the center of the "pulse width T0" during which the NMOS transistor 22 is on, and the second predetermined timing is the timing at or after the center of the "pulse width T0" during which the NMOS transistor 23 is on. This enable correct determination of the direction in which the resonant current Icr flows regardless of change in the load current Iload.

(5) In addition, the predetermined timing is the timing at the center of the "pulse width T0" during which the NMOS transistor 22 is on, and the second predetermined timing is the timing at the center of the "pulse width T0" during which the NMOS transistor 23 is on. This enables correct determination of the direction in which the resonant current Icr flows even if the resonant current Icr includes only the excitation current Iex.

(6) In addition, the timing signal output circuit 63 outputs the timing signal tim1 indicating the predetermined timing and the timing signal tim2 indicating the second predetermined timing to the determination circuit 61. This enables generation of the timing signals tim1, tim2 based on the "pulse width T0".

(7) In addition, the comparator 71 detects the direction of the resonant current Icr, and the mode determination circuit 72 determines whether the switching power supply circuit 10 operates in the mode A or the mode B based on the direction of the resonant current Icr at the predetermined timing or the second predetermined timing. This enables reduction in the shoot-through current regardless of when the switching power supply circuit 10 is activated or when the normal operation is performed.

(8) In addition, in the case where the switching power supply circuit 10 operates in the mode B, the drive signal generating circuit 84 turns off one of the NMOS transistor 22 and 23, and thereafter turns on the other of the NMOS transistor 22 and 23 when the voltage Vis corresponding to the resonant current Icr becomes higher than the reference voltage VREF1 after turning off of the NMOS transistor 22, or the voltage Vis becomes lower than the reference voltage VREF2 after turning off of the NMOS transistor 23. Further, in the case where the switching power supply circuit 10 operates in the mode A, the drive signal generating circuit 84 turns off the NMOS transistor 22 or 23 that is on when the resonant current Icr becomes substantially zero, in other words, the voltage Vis corresponding to the resonant current Icr becomes lower than the reference voltage VREF1 as well as higher than the reference voltage VREF2. This enables reduction in the shoot-through current that flows in the switching power supply circuit 10.

(9) In addition, in the case where the switching power supply circuit 10 operates in the mode B, the drive signal generating circuit 84 turns on the NMOS transistor 22 when the voltage Vis corresponding to the resonant current Icr becomes lower than the reference voltage VREF2 after turning off of the NMOS transistor 23. In the case where the switching power supply circuit 10 operates in the mode A, the drive signal generating circuit 84 turns off the NMOS transistor 23 when the voltage Vis corresponding to the resonant current Icr becomes higher than the reference voltage VREF2. This enables reduction in the shoot-through current that flows in the switching power supply circuit 10.

(10) In addition, it is desirable that the determination circuit 61 and the drive signal output circuit 62 are used for an LLC converter.

Embodiments of the present disclosure described above are simply to facilitate the understanding of the present disclosure and are not in any way to be construed as limiting the present disclosure. The present disclosure may variously be changed or altered without departing from its essential features and encompass equivalents thereof.

It is possible to provide a switching control circuit that effectively reduces a shoot-through current regardless of an operation of an LLC converter.

What is claimed is:

1. A switching control circuit for controlling an LLC converter that includes
   a first switching device,
   a first free-wheeling diode connected in antiparallel with the first switching device,
   a second switching device connected in series with the first switching device and the first free-wheeling diode, and
   a second free-wheeling diode connected in antiparallel with the second switching device,
the switching control circuit being configured to control switching of the first and second switching devices, the switching control circuit comprising:
   a determination circuit configured to determine, based on a resonant current of the LLC converter, whether an operation mode of the LLC converter is
   a first mode, in which the resonant current in a positive direction flows after the second switching device is turned on, and the resonant current in a negative direction flows after the first switching device is turned on, or
   a second mode, in which the resonant current in the positive direction flows after the first switching device is turned on, and the resonant current in the negative direction flows after second switching device is turned on; and
   a drive signal output circuit configured to output first and second drive signals for respectively switching the first switching device and the second switching device based on the determined operation mode, to thereby prevent a shoot-through current from flowing through the first switching device or the second switching device.

2. The switching control circuit according to claim 1, wherein
   the determination circuit determines the operation mode based on the resonant current at a first timing in a time period during which the first switching device is on.

3. The switching control circuit according to claim 2, wherein
   the determination circuit determines the operation mode based further on the resonant current at a second timing in a time period during which the second switching device is on.

4. The switching control circuit according to claim 3, further comprising
   a timing signal output circuit configured to output, to the determination circuit, a first timing signal indicating the first timing and a second timing signal indicating the second timing.

5. The switching control circuit according to claim 3, wherein
   the LLC converter includes a resonant circuit in which the resonant current flows, the resonant circuit being connected in parallel with the second switching device, the resonant circuit including an inductor and a capacitive element that are connected in series;

the first switching device is on a power supply side of the LLC converter, and the second switching device is on a ground side of the LLC converter;

the resonant current flows from a node between the first switching device and the second switching device to the resonant circuit, or flows from the resonant circuit to the node, the resonant current having a direction that is positive from the node to the resonant circuit, and is negative from the resonant circuit to the node; and the determination circuit includes
- a first detection circuit configured to detect the direction of the resonant current, and
- a mode determination circuit configured to determine that
  - the operation mode is the first mode when the direction is negative at the first timing, and is the second mode when the direction is positive at the first timing, and
  - the operation mode is the first mode when the direction is positive at the second timing, and is the second mode when the direction is negative at the second timing.

6. The switching control circuit according to claim 1, wherein in a case where the LLC converter operates in the first mode, the drive signal output circuit turns off one of the first switching device and the second switching device, and thereafter turns on the other of the first switching device and the second switching device when a magnitude of the resonant current becomes smaller than a first predetermined value, and in a case where the LLC converter operates in the second mode, the drive signal output circuit turns off one of the first and second switching devices that is on, when the magnitude of the resonant current becomes smaller than a second predetermined value.

7. The switching control circuit according to claim 1, wherein in a case where the LLC converter operates in the first mode, the drive signal output circuit turns off the second switching device, and thereafter turns on the first switching device when a current value of the resonant current becomes smaller than a third predetermined value, and in a case where the LLC converter operates in the second mode, the drive signal output circuit turns off the second switching device when the current value of the resonant current becomes greater than a fourth predetermined value.

8. The switching control circuit according to claim 1, wherein in the first mode, the resonant current in the positive direction flows after a first rising edge of the second drive signal and before a first falling edge of the second drive signal while the second switching device is turned on, and the resonant current in a negative direction flows after a second rising edge of the first drive signal and before a second falling edge of the first drive signal while the first switching device is turned on; and in the second mode, the resonant current in the positive direction flows after a third rising edge of the first drive signal and before a third falling edge of the first drive signal while the first switching device is turned on, and the resonant current in the negative direction flows after a forth rising edge of the second drive signal and before a forth falling edge of the second drive signal while the second switching device is turned on.

9. A switching control circuit for controlling an LLC converter that includes
- a first switching device,
- a first free-wheeling diode connected in antiparallel with the first switching device,
- a second switching device connected in series with the first switching device and the first free-wheeling diode, and
- a second free-wheeling diode connected in antiparallel with the second switching device, the switching control circuit being configured to control switching of the first and second switching devices, the switching control circuit comprising:
- a determination circuit configured to determine whether an operation mode of the LLC converter is a first mode or a second mode based on a resonant current of the LLC converter; and
- a drive signal output circuit configured to output first and second drive signals for respectively switching the first switching device and the second switching device based on the determined operation mode, to thereby prevent a shoot-through current from flowing through the first switching device or the second switching device, wherein the determination circuit determines the operation mode based on
- the resonant current at a first timing in a time period during which the first switching device is on, and
- the resonant current at a second timing in a time period during which the second switching device is on,
- the first timing is a timing at or after a center of the time period during which the first switching device is on, and
- the second timing is a timing at or after a center of the time period during which the second switching device is on.

10. The switching control circuit according to claim 9, wherein the first timing is a timing at the center of the time period during which the first switching device is on, and the second timing is a timing at the center of the time period during which the second switching device is on.

11. A switching control circuit for controlling an LLC converter that includes
- a first switching device,
- a first free-wheeling diode connected in antiparallel with the first switching device,
- a second switching device connected in series with the first switching device and the first free-wheeling diode, and
- a second free-wheeling diode connected in antiparallel with the second switching device, the switching control circuit being configured to control switching of the first and second switching devices, the switching control circuit comprising:
- a determination circuit configured to determine whether an operation mode of the LLC converter is a first mode or a second mode based on a resonant current of the LLC converter; and
- a drive signal output circuit configured to output first and second drive signals for respectively switching the first switching device and the second switching device based on the determined operation mode, to thereby prevent a shoot-through current from flowing through the first switching device or the second switching device, wherein the determination circuit determines whether the operation mode is the first mode or the second mode based on whether the resonant current in a positive flow direction or a negative flow direction during a first timing of the first switching device being turned on or a second timing of the second switching device being turned on.

12. The switching control circuit according to claim 11, wherein
the determination circuit determines the operation mode based on the resonant current at the first timing in a time period during which the first switching device is on.

13. The switching control circuit according to claim 12, wherein
the determination circuit determines the operation mode based further on the resonant current at the second timing in a time period during which the second switching device is on.

14. The switching control circuit according to claim 13, wherein
the first timing is a timing at or after a center of the time period during which the first switching device is on, and
the second timing is a timing at or after a center of the time period during which the second switching device is on.

15. The switching control circuit according to claim 14, wherein
the first timing is a timing at the center of the time period during which the first switching device is on, and
the second timing is a timing at the center of the time period during which the second switching device is on.

16. The switching control circuit according to claim 13, further comprising
a timing signal output circuit configured to output, to the determination circuit, a first timing signal indicating the first timing and a second timing signal indicating the second timing.

17. The switching control circuit according to claim 13, wherein
the LLC converter includes a resonant circuit in which the resonant current flows, the resonant circuit being connected in parallel with the second switching device, the resonant circuit including an inductor and a capacitive element that are connected in series;

the first switching device is on a power supply side of the LLC converter, and the second switching device is on a ground side of the LLC converter;

the resonant current flows from a node between the first switching device and the second switching device to the resonant circuit, or flows from the resonant circuit to the node, the resonant current having a direction that is positive from the node to the resonant circuit, and is negative from the resonant circuit to the node; and the determination circuit includes
a first detection circuit configured to detect the direction of the resonant current, and
a mode determination circuit configured to determine that
the operation mode is the first mode when the direction is negative at the first timing, and is the second mode when the direction is positive at the first timing, and
the operation mode is the first mode when the direction is positive at the second timing, and is the second mode when the direction is negative at the second timing.

18. The switching control circuit according to claim 11, wherein
in a case where the LLC converter operates in the first mode, the drive signal output circuit turns off one of the first switching device and the second switching device, and thereafter turns on the other of the first switching device and the second switching device when a magnitude of the resonant current becomes smaller than a first predetermined value, and
in a case where the LLC converter operates in the second mode, the drive signal output circuit turns off one of the first and second switching devices that is on, when the magnitude of the resonant current becomes smaller than a second predetermined value.

19. The switching control circuit according to claim 11, wherein
in a case where the LLC converter operates in the first mode, the drive signal output circuit turns off the second switching device, and thereafter turns on the first switching device when a current value of the resonant current becomes smaller than a third predetermined value, and
in a case where the LLC converter operates in the second mode, the drive signal output circuit turns off the second switching device when the current value of the resonant current becomes greater than a fourth predetermined value.

\* \* \* \* \*